(12) United States Patent
Afshari

(10) Patent No.: US 12,460,636 B2
(45) Date of Patent: Nov. 4, 2025

(54) DYNAMIC CONTROL OF GEARS IN A GEAR PUMP HAVING A DRIVE-DRIVE CONFIGURATION

(71) Applicant: Project Phoenix, LLC, Mesa, AZ (US)

(72) Inventor: Thomas Afshari, Mesa, AZ (US)

(73) Assignee: PROJECT PHOENIX, LLC, Mesa, AZ (US)

( * ) Notice: Subject to any disclaimer, the term of this patent is extended or adjusted under 35 U.S.C. 154(b) by 383 days.

(21) Appl. No.: 18/004,539

(22) PCT Filed: Jul. 7, 2021

(86) PCT No.: PCT/US2021/040686
§ 371 (c)(1),
(2) Date: Jan. 6, 2023

(87) PCT Pub. No.: WO2022/011013
PCT Pub. Date: Jan. 13, 2022

(65) Prior Publication Data
US 2023/0250820 A1 Aug. 10, 2023

Related U.S. Application Data

(60) Provisional application No. 63/049,307, filed on Jul. 8, 2020.

(51) Int. Cl.
*F04C 14/08* (2006.01)
*F04C 2/18* (2006.01)

(52) U.S. Cl.
CPC ............. *F04C 14/08* (2013.01); *F04C 2/18* (2013.01); *F04C 2240/402* (2013.01); *F04C 2270/035* (2013.01); *F04C 2270/175* (2013.01)

(58) Field of Classification Search
CPC ...... F04C 2/18; F04C 2240/402; F04C 14/08; F04C 2270/035; F04C 2270/03; F04C 2270/05; F16H 61/4008; F16H 61/4035
(Continued)

(56) References Cited

U.S. PATENT DOCUMENTS 337,551 A 3/1886 Berrenberg et al.
688,616 A 12/1901 Ferguson
(Continued)

FOREIGN PATENT DOCUMENTS

CA 2236535 A1 11/1999
CA 2878316 A1 3/2014
(Continued)

OTHER PUBLICATIONS

International Search Report and Written Opinion of International Application No. PCT/US2021/040686; Date of Mailing: Oct. 21, 2021; 11 pages.
(Continued)

*Primary Examiner* — Mark A Laurenzi
*Assistant Examiner* — Benjamin Doyle
(74) *Attorney, Agent, or Firm* — Perkins Coie LLP

(57) ABSTRACT

An apparatus includes a torque adjustment circuit to receive a torque setpoint and a torque feedback signal corresponding to a differential torque between a pair of meshing gear teeth of a first gear and a second gear. The torque adjustment circuit is further configured to output a torque adjustment signal corresponding to a difference between the torque setpoint and the torque feedback signal. The apparatus also includes a motion control circuit to provide a first speed demand signal to a first motor that drives the first gear and a second demand signal to a second motor that drives the second gear, and dynamically synchronize torque between the pair of meshing gear teeth such that the differential torque between the pair of meshing gear teeth is within a predetermined range by adjusting at least one of the first speed demand signal or the second speed demand signal.

17 Claims, 7 Drawing Sheets

(58) Field of Classification Search
USPC .................. 318/41, 49, 616; 417/16; 418/2
See application file for complete search history.

(56) References Cited

U.S. PATENT DOCUMENTS

| | | | |
|---|---|---|---|
| 1,341,846 A | 6/1920 | Gollings | |
| 1,361,423 A | 12/1920 | Waterous | |
| 1,407,496 A | 2/1922 | Storey | |
| 1,418,741 A | 6/1922 | Stallman | |
| 1,665,120 A | 4/1928 | Wendell | |
| 1,681,796 A | 8/1928 | Wendell | |
| 1,712,157 A | 5/1929 | Morita | |
| 2,439,427 A | 4/1948 | Guibert et al. | |
| 2,572,334 A | 10/1951 | Guibert | |
| 2,601,397 A | 6/1952 | Hill et al. | |
| 2,621,603 A | 12/1952 | Thomas | |
| 2,918,209 A | 12/1959 | Schueller | |
| 2,927,429 A | 3/1960 | Carlson | |
| 2,928,295 A | 3/1960 | Boulanger | |
| 2,937,807 A | 5/1960 | Lorenz | |
| 2,940,661 A | 6/1960 | Lorenz | |
| 3,136,224 A | 6/1964 | Escobosa | |
| 3,264,502 A | 8/1966 | Lytle et al. | |
| 3,585,973 A | 6/1971 | Klover | |
| 3,694,105 A | 9/1972 | Martin | |
| 3,763,746 A | 10/1973 | Walters | |
| 3,922,855 A | 12/1975 | Bridwell et al. | |
| 3,932,993 A | 1/1976 | Riedhammer | |
| 3,979,910 A | 9/1976 | Leuenberger et al. | |
| 4,016,719 A | 4/1977 | Yavnai | |
| 4,030,403 A | 6/1977 | Elser | |
| 4,328,450 A * | 5/1982 | Gabor | G05B 19/232 |
| | | | 318/685 |
| 4,345,436 A | 8/1982 | Johnson | |
| 4,369,625 A | 1/1983 | Izumi et al. | |
| 4,418,610 A | 12/1983 | Holtrop | |
| 4,529,362 A | 7/1985 | Ichiryu et al. | |
| 4,627,237 A | 12/1986 | Hutson | |
| 4,630,441 A | 12/1986 | Chamberlain | |
| 4,682,939 A | 7/1987 | Petro | |
| 4,696,163 A | 9/1987 | Glomeau | |
| 4,850,812 A | 7/1989 | Voight | |
| 5,026,248 A | 6/1991 | Hamilton | |
| 5,048,294 A | 9/1991 | Oshina et al. | |
| 5,073,091 A | 12/1991 | Burgess et al. | |
| 5,161,957 A | 11/1992 | Ribaudo | |
| 5,197,861 A | 3/1993 | Maruyama et al. | |
| 5,271,719 A | 12/1993 | Abe et al. | |
| 5,295,798 A | 3/1994 | Maruyama et al. | |
| 5,329,216 A | 7/1994 | Hasegawa | |
| 5,417,551 A * | 5/1995 | Abe | F04C 25/02 |
| | | | 417/205 |
| 5,708,311 A | 1/1998 | Claar et al. | |
| 5,709,537 A | 1/1998 | Maruyama et al. | |
| 5,767,635 A * | 6/1998 | Steffens | F04C 28/28 |
| | | | 318/625 |
| 5,767,638 A | 6/1998 | Wu et al. | |
| 5,778,671 A | 7/1998 | Bloomquist et al. | |
| 5,836,746 A | 11/1998 | Maruyama et al. | |
| 6,002,186 A | 12/1999 | Coutu et al. | |
| 6,004,119 A | 12/1999 | Yoshiaki et al. | |
| 6,042,095 A | 3/2000 | Kuchta | |
| 6,048,235 A | 4/2000 | Kai | |
| 6,053,717 A | 4/2000 | Dixon | |
| 6,155,790 A | 12/2000 | Pyötsiä0 et al. | |
| 6,247,906 B1 | 6/2001 | Pijanowski | |
| 6,447,256 B2 | 9/2002 | Bussard | |
| 6,447,266 B2 | 9/2002 | Antaki et al. | |
| 6,543,223 B2 | 4/2003 | Muschong et al. | |
| 6,652,249 B2 | 11/2003 | Kenney et al. | |
| 6,796,120 B2 | 9/2004 | Franchet et al. | |
| 6,971,463 B2 | 12/2005 | Shore et al. | |
| 6,979,185 B2 | 12/2005 | Kaempe | |
| 7,000,386 B1 | 2/2006 | Morgan | |
| 7,051,526 B2 | 5/2006 | Geiger | |
| 7,148,635 B1 * | 12/2006 | Piefer | H04L 12/43 |
| | | | 318/52 |
| 7,155,910 B2 | 1/2007 | Last | |
| 7,191,593 B1 | 3/2007 | Ho | |
| 7,232,292 B2 | 6/2007 | Lopatinsky et al. | |
| 7,240,893 B2 | 7/2007 | Komaba et al. | |
| 7,281,372 B2 | 10/2007 | Sakai et al. | |
| 7,434,395 B2 | 10/2008 | He | |
| 7,537,441 B2 | 5/2009 | Iwasaki | |
| 7,870,727 B2 | 1/2011 | Mueller et al. | |
| 7,927,079 B2 | 4/2011 | Suzuki et al. | |
| 8,157,539 B2 | 4/2012 | Hidaka et al. | |
| 8,167,589 B2 | 5/2012 | Hidaka et al. | |
| 8,206,134 B2 | 6/2012 | Moldovan et al. | |
| 8,448,432 B2 | 5/2013 | Bresie | |
| 8,869,924 B2 | 10/2014 | Kim | |
| 8,959,905 B2 | 2/2015 | Baltes et al. | |
| 9,228,586 B2 | 1/2016 | Afshari | |
| 9,234,532 B2 | 1/2016 | Vanderlaan et al. | |
| 9,670,943 B2 | 6/2017 | Gomm et al. | |
| 9,920,755 B2 | 3/2018 | Afshari | |
| 10,072,676 B2 | 9/2018 | Afshari | |
| 10,294,936 B2 | 5/2019 | Afshari | |
| 10,465,721 B2 | 11/2019 | Afshari | |
| 10,539,134 B2 | 1/2020 | Afshari | |
| 10,544,810 B2 | 1/2020 | Afshari | |
| 10,544,861 B2 | 1/2020 | Afshari | |
| 10,598,176 B2 | 3/2020 | Afshari | |
| 10,677,352 B2 | 6/2020 | Afshari | |
| 10,738,799 B2 | 8/2020 | Afshari | |
| 10,808,732 B2 | 10/2020 | Afshari | |
| 10,865,788 B2 | 12/2020 | Afshari | |
| 10,995,750 B2 | 5/2021 | Afshari | |
| 11,054,026 B2 | 7/2021 | Afshari | |
| 11,060,534 B2 | 7/2021 | Afshari | |
| 11,085,440 B2 | 8/2021 | Afshari | |
| 11,118,581 B2 | 9/2021 | Afshari | |
| 11,242,851 B2 | 2/2022 | Afshari | |
| 11,280,334 B2 | 3/2022 | Afshari | |
| 11,408,442 B2 | 8/2022 | Afshari | |
| 11,512,695 B2 | 11/2022 | Afshari | |
| 11,607,170 B2 | 3/2023 | Sivan | |
| 2001/0036415 A1 | 11/2001 | Pijanowski | |
| 2002/0009368 A1 * | 1/2002 | Bussard | F04C 15/008 |
| | | | 417/16 |
| 2003/0077183 A1 | 4/2003 | Franchet et al. | |
| 2003/0091448 A1 | 5/2003 | Prampolini | |
| 2003/0126981 A1 | 7/2003 | Bridger et al. | |
| 2003/0151315 A1 | 8/2003 | Choi et al. | |
| 2003/0225396 A1 | 12/2003 | Cartledge et al. | |
| 2004/0060430 A1 | 4/2004 | Brinkman | |
| 2004/0089234 A1 | 5/2004 | Hagglund et al. | |
| 2004/0191103 A1 | 9/2004 | Gotschhofer | |
| 2004/0213680 A1 | 10/2004 | Suzuki et al. | |
| 2005/0022523 A1 | 2/2005 | Nagai et al. | |
| 2005/0050965 A1 * | 3/2005 | Zaremba | B60L 15/025 |
| | | | 73/862.08 |
| 2005/0089414 A1 | 4/2005 | Ohman | |
| 2005/0112012 A1 | 5/2005 | Marheineie | |
| 2005/0144939 A1 | 7/2005 | Mentink et al. | |
| 2005/0254970 A1 | 11/2005 | Mayer et al. | |
| 2006/0001202 A1 | 1/2006 | Bauman | |
| 2006/0039804 A1 | 2/2006 | Jordan et al. | |
| 2006/0156713 A1 | 7/2006 | Kadlicko | |
| 2007/0074511 A1 | 4/2007 | Verkuilen | |
| 2007/0098576 A1 | 5/2007 | Horng et al. | |
| 2007/0101711 A1 | 5/2007 | Debus | |
| 2007/0157612 A1 | 7/2007 | He | |
| 2007/0166168 A1 | 7/2007 | Vigholm | |
| 2008/0010984 A1 | 1/2008 | Arbel et al. | |
| 2008/0190104 A1 | 8/2008 | Bresie | |
| 2009/0210120 A1 | 8/2009 | Stein | |
| 2009/0266934 A1 | 10/2009 | Makino | |
| 2009/0297370 A1 | 12/2009 | Moldovan et al. | |
| 2010/0226806 A1 | 9/2010 | Mellet et al. | |
| 2010/0247362 A1 | 9/2010 | Koizumi | |
| 2010/0264885 A1 | 10/2010 | Olsen et al. | |
| 2010/0322805 A1 | 12/2010 | Aregger | |

(56) References Cited

U.S. PATENT DOCUMENTS

| | | | |
|---|---|---|---|
| 2010/0322806 A1* | 12/2010 | Aregger | F04C 15/0061 |
| | | | 418/2 |
| 2011/0000203 A1 | 1/2011 | Riedel et al. | |
| 2011/0017310 A1 | 1/2011 | Eriksson | |
| 2011/0030364 A1 | 2/2011 | Persson et al. | |
| 2011/0030505 A1 | 2/2011 | Hoyle et al. | |
| 2011/0089082 A1 | 4/2011 | Snawerdt | |
| 2011/0135516 A1 | 6/2011 | Oishi et al. | |
| 2011/0209471 A1 | 9/2011 | Vanderlaan et al. | |
| 2011/0250082 A1 | 10/2011 | Han et al. | |
| 2012/0141315 A1 | 6/2012 | Seto et al. | |
| 2012/0173027 A1 | 7/2012 | Cheng et al. | |
| 2012/0213657 A1 | 8/2012 | Kimberlin et al. | |
| 2012/0233997 A1 | 9/2012 | Andruch, III et al. | |
| 2012/0260641 A1 | 10/2012 | Opdenboch | |
| 2012/0260642 A1 | 10/2012 | Opdenboch | |
| 2012/0305603 A1 | 12/2012 | Kwok et al. | |
| 2013/0074487 A1 | 3/2013 | Herold et al. | |
| 2013/0091833 A1 | 4/2013 | Zhan et al. | |
| 2013/0098015 A1 | 4/2013 | Opdenbosh | |
| 2013/0098017 A1 | 4/2013 | Knussman et al. | |
| 2013/0098464 A1 | 4/2013 | Knussman | |
| 2013/0183185 A1 | 7/2013 | Dirscherl et al. | |
| 2013/0239558 A1 | 9/2013 | Shirao | |
| 2013/0298542 A1 | 11/2013 | Lowman et al. | |
| 2014/0105714 A1 | 4/2014 | Kim | |
| 2014/0130487 A1 | 5/2014 | Akiyama et al. | |
| 2014/0174549 A1 | 6/2014 | Dybing | |
| 2014/0260233 A1 | 9/2014 | Giovanardi | |
| 2014/0308103 A1 | 10/2014 | Pike | |
| 2014/0308106 A1 | 10/2014 | Beschorner | |
| 2014/0366519 A1 | 12/2014 | Sadamori | |
| 2015/0121860 A1 | 5/2015 | Hyon | |
| 2015/0275927 A1 | 10/2015 | Gomm et al. | |
| 2015/0308463 A1* | 10/2015 | Gomm | F15B 11/003 |
| | | | 60/459 |
| 2015/0361743 A1 | 12/2015 | Mikkulainen | |
| 2016/0084274 A1 | 3/2016 | Afshari | |
| 2016/0102685 A1 | 4/2016 | Chester | |
| 2016/0201694 A1 | 7/2016 | Vacca et al. | |
| 2017/0097019 A1* | 4/2017 | Afshari | F04C 14/08 |
| 2018/0252213 A1* | 9/2018 | Afshari | F04B 49/22 |
| 2018/0266415 A1* | 9/2018 | Afshari | F15B 15/18 |
| 2018/0291895 A1* | 10/2018 | Afshari | F04C 14/08 |
| 2019/0063431 A1* | 2/2019 | Kagawa | F04C 11/00 |
| 2020/0347854 A1 | 11/2020 | Afshari | |
| 2021/0277893 A1 | 9/2021 | Afshari | |
| 2021/0285442 A1* | 9/2021 | Kamada | F04C 2/26 |
| 2021/0317829 A1 | 10/2021 | Afshari | |
| 2022/0049696 A1* | 2/2022 | Jang | F04C 14/08 |
| 2022/0128006 A1* | 4/2022 | Shimamura | F02C 7/22 |
| 2022/0163054 A1 | 5/2022 | Afshari | |
| 2022/0220959 A1 | 7/2022 | Afshari | |

FOREIGN PATENT DOCUMENTS

| | | |
|---|---|---|
| CH | 625600 A5 | 9/1981 |
| CN | 101994690 A | 3/2011 |
| CN | 202165337 U | 3/2012 |
| CN | 101655087 A | 2/2018 |
| CN | 109779985 A | 5/2019 |
| DE | 1258617 | 1/1968 |
| DE | 1528965 | 10/1969 |
| DE | 3230550 A1 | 1/1984 |
| DE | 3247004 A1 | 6/1984 |
| DE | 3821321 A1 | 12/1989 |
| DE | 102008018407 A1 | 10/2009 |
| DE | 102009027282 A1 | 12/2010 |
| DE | 102009028095 A1 | 2/2011 |
| DE | 102009045028 A1 | 3/2011 |
| DE | 102011005831 A1 | 9/2012 |
| DE | 102012102156 A1 | 10/2012 |
| DE | 102011076127 A1 | 11/2012 |
| EP | 0558921 A1 | 9/1993 |
| EP | 0942173 A1 | 9/1999 |
| EP | 1249608 A1 | 10/2002 |
| EP | 1531269 A1 | 5/2005 |
| EP | 1967745 A1 | 9/2008 |
| EP | 2113666 A2 | 11/2009 |
| EP | 2767720 A1 | 8/2014 |
| EP | 2816237 A1 | 12/2014 |
| FR | 2119294 A5 | 8/1972 |
| FR | 2428771 A1 | 1/1980 |
| GB | 270000 A | 5/1927 |
| GB | 1081711 A | 8/1967 |
| GB | 1284551 A | 8/1972 |
| GB | 1284552 A | 8/1972 |
| GB | 1284553 A | 8/1972 |
| GB | 1450436 A | 9/1976 |
| GB | 2123089 A | 1/1984 |
| GB | 2259333 A | 3/1993 |
| JP | S5920590 A | 2/1984 |
| JP | H11166496 A | 6/1999 |
| JP | H11336671 A | 12/1999 |
| JP | 2001011899 A | 1/2001 |
| JP | 2001153066 A | 6/2001 |
| JP | 2002147370 A | 6/2002 |
| JP | 2003088084 A | 3/2003 |
| JP | 2003106304 A | 4/2003 |
| JP | 2006316662 A | 11/2006 |
| JP | 3154210 U | 10/2009 |
| JP | 2010038316 A | 2/2010 |
| JP | 2014009655 A | 1/2014 |
| JP | 2014512495 A | 5/2014 |
| RU | 2284424 C1 | 9/2006 |
| RU | 2009149035 A | 8/2011 |
| SU | 857550 A1 | 8/1981 |
| SU | 1087705 A | 4/1984 |
| WO | WO9113256 A1 | 9/1991 |
| WO | WO01073295 A1 | 10/2001 |
| WO | WO03069160 A1 | 8/2003 |
| WO | WO2004071845 A1 | 8/2004 |
| WO | WO2008060681 A2 | 5/2008 |
| WO | WO2010083991 A2 | 7/2010 |
| WO | WO2010097596 A1 | 9/2010 |
| WO | WO2011035971 A2 | 3/2011 |
| WO | WO2011048261 A1 | 4/2011 |
| WO | WO2011072502 A1 | 6/2011 |
| WO | WO2012122159 A2 | 9/2012 |
| WO | WO2013006902 A1 | 1/2013 |
| WO | WO2013027620 A1 | 2/2013 |
| WO | WO2014060760 A2 | 4/2014 |
| WO | WO2014074713 A1 | 5/2014 |
| WO | WO2014135284 A1 | 9/2014 |
| WO | WO2014176256 A1 | 10/2014 |
| WO | WO2017040825 A1 | 3/2017 |
| WO | 2018206050 A1 | 11/2018 |

OTHER PUBLICATIONS

U.S. Appl. No. 16/936,366, filed Jul. 22, 2020, titled Linear Actuator Assembly and System.
U.S. Appl. No. 17/022,059, filed Sep. 15, 2020, now U.S. Pat. No. 11,408,442, titled System to Pump Fluid and Control Thereof.
U.S. Appl. No. 17/092,159, filed Nov. 6, 2020, now U.S. Pat. No. 11,846,283, titled System to Pump Fluid and Control Thereof.
U.S. Appl. No. 17/243,483, filed Apr. 28, 2021, now U.S. Pat. No. 11,512,695, titled System to Pump Fluid and Control Thereof.
U.S. Appl. No. 17/358,410, filed Jun. 25, 2021, titled System to Pump Fluid and Control Thereof.
U.S. Appl. No. 17/364,097, filed Jun. 30, 2021, now U.S. Pat. No. 11,867,203, titled Linear Actuator Assembly and System.
U.S. Appl. No. 17/411,326, filed Aug. 25, 2021, now U.S. Pat. No. 11,713,757, titled Pump Integrated With Two Independently Driven Prime Movers.
U.S. Appl. No. 17/555,978, filed Dec. 20, 2021, now abandoned, titled Linear Actuator Assembly and System, now abandoned.
U.S. Appl. No. 17/842,453, filed Jun. 16, 2022, now abandoned, titled System to Pump Fluid and Control Thereof.
U.S. Appl. No. 18/004,610, filed Jan. 6, 2023, titled Dynamic Control of Gears in a Gear Pump Having a Drive-Drive Configuration.

(56) References Cited

OTHER PUBLICATIONS

U.S. Appl. No. 18/331,430, filed Jun. 8, 2023, titled Pump Integrated With Two Independently Driven Prime Movers.
U.S. Appl. No. 18/502,541, filed Nov. 6, 2023, titled System to Pump Fluid and Control Thereof.
Examination Report for EP Application No. 15784832.6; 6 pages (Dec. 21, 2023).
Examination Report for EP Application No. 21168887.4; 4 pages (Mar. 19, 2024).
Examination Report for EP Application No. 21201681.0; 4 pages (Mar. 13, 2024).
Taiwan Office Action in Taiwan Application No. 111141744, 9 pages (Jul. 10, 2023).
U.S. Appl. No. 14/637,064, filed Mar. 3, 2015, now U.S. Pat. No. 9,228,586, titled Pump Integrated With Two Independently Driven Prime Movers.
U.S. Appl. No. 14/862,608, filed Sep. 23, 2015, now U.S. Pat. No. 10,072,676, titled System to Pump Fluid and Control Thereof.
U.S. Appl. No. 14/944,368, filed Nov. 18, 2015, now U.S. Pat. No. 9,920,755, titled Pump Integrated With Two Independently Driven Prime Movers.
U.S. Appl. No. 15/128,269, filed Sep. 22, 2016, now U.S. Pat. No. 10,465,721, titled System to Pump Fluid and Control Thereof.
U.S. Appl. No. 15/305,579, filed Apr. 22, 2015, now U.S. Pat. No. 10,294,936, titled Fluid Delivery System With a Shaft Having a Through-Passage.
U.S. Appl. No. 15/315,560, filed Jun. 2, 2015, now U.S. Pat. No. 10,544,861, titled Hydrostatic Transmission Assembly and System.
U.S. Appl. No. 15/315,575, filed Jun. 2, 2015, now U.S. Pat. No. 10,544,810, titled Linear Actuator Assembly and System.
U.S. Appl. No. 15/315,592, filed Jun. 2, 2015, now U.S. Pat. No. 10,738,799, titled Linear Actuator Assembly and System.
U.S. Appl. No. 15/327,748, filed Jul. 22, 2015, now U.S. Pat. No. 10,598,176, titled External Gear Pump Integrated With Two Independently Driven Prime Movers.
U.S. Appl. No. 15/517,356, filed Oct. 2, 2015, now U.S. Pat. No. 10,598,176, titled Linear Actuator Assembly and System.
U.S. Appl. No. 15/520,386, filed Oct. 6, 2015, now U.S. Pat. No. 10,677,352, titled Hydrostatic Transmission Assembly and System.
U.S. Appl. No. 15/756,928, filed Mar. 1, 2018, now U.S. Pat. No. 11,085,440, titled System to Pump Fluid and Control Thereof.
U.S. Appl. No. 15/756,942, filed Sep. 1, 2016, now U.S. Pat. No. 10,865,788, titled System to Pump Fluid and Control Thereof.
U.S. Appl. No. 15/887,856, filed Feb. 2, 2018, now U.S. Pat. No. 11,060,534, titled Pump Integrated With Two Independently Drive Prime Movers.
U.S. Appl. No. 16/118,167, filed Aug. 30, 2018, now U.S. Pat. No. 10,808,732, titled System to Pump Fluid and Control Thereof.
U.S. Appl. No. 16/374,456, filed Apr. 3, 2019, now U.S. Pat. No. 11,280,334, titled Fluid Delivery System With a Shaft Having a Through-Passage.
U.S. Appl. No. 16/698,566, filed Nov. 27, 2019, now U.S. Pat. No. 11,054,026, titled Hydrostatic Transmission Assembly and System.
U.S. Appl. No. 16/698,631, filed Nov. 27, 2019, now U.S. Pat. No. 11,242,851, titled Linear Actuator Assembly and System.
U.S. Appl. No. 16/714,504, filed Dec. 13, 2019, now U.S. Pat. No. 11,060,634, titled Linear Actuator Assembly and System.
U.S. Appl. No. 16/714,540, filed Dec. 13, 2019, now U.S. Pat. No. 11,067,170, titled Hydrostatic Transmission Assembly and System.
U.S. Appl. No. 16/787,876, filed Feb. 11, 2020, now U.S. Pat. No. 10,995,750, titled External Gear Pump Integrated With Two Independently Driven Prime Movers.
U.S. Appl. No. 17/022,059, now U.S. Pat. No. 11,408,442, filed Sep. 15, 2020, titled System to Pump Fluid and Control Thereof.
U.S. Appl. No. 17/092,159, filed Nov. 6, 2020, titled System to Pump Fluid and Control Thereof.
U.S. Appl. No. 17/364,097, filed Jun. 30, 2021, titled Linear Actuator Assembly and System.
U.S. Appl. No. 17/411,326, filed Aug. 25, 2021, titled Pump Integrated With Two Independently Driven Prime Movers.
Esposito, Fluid Power with Applicators, 7th Ed., Chapter 5, pp. 154-162 (2009).
Marks' Standard Handbook for Mechanical Engineers, Eighth Ed., Section 14, pp. 14-1-14-31 (1978).
Yusof et al., "Slip flow coefficient analysis in water hydraulics gear pump for environmental friendly application," IOP Conf. Series: Materials Science and Engineering, 50:012016 (2013).
International Search Report and Written Opinion, International Application No. PCT/US2015/018342 (published as WO 2015/131196), 19 pages (Jul. 20, 2015).
International Search Report and Written Opinion, International Application No. PCT/US2015/022484, (published as WO 2015/148662), 9 pages (Jun. 9, 2015).
International Search Report and Written Opinion, International Application No. PCT/US2015/027003 (published as WO 2015/164453), 18 pages (Nov. 4, 2015).
International Search Report and Written Opinion, International Application No. PCT/US2015/033752 (published as WO 2015/187673), 15 pages (Sep. 29, 2015).
International Search Report and Written Opinion, International Application No. PCT/US2015/033764 (published as WO 2015/187681), 7 pages (Aug. 19, 2015).
International Search Report and Written Opinion, International Application No. PCT/US2015/033776 (published as WO 2015/187688), 31 pages (Oct. 28, 2015).
International Search Report and Written Opinion, International Application No. PCT/US2015/041612 (published as WO 2016/014715), 8 pages (Sep. 28, 2015).
International Search Report and Written Opinion, International Application No. PCT/US2015/053670 (published as WO 2015/057321), 10 pages (Dec. 16, 2015).
International Search Report and Written Opinion, International Application No. PCT/US2015/054145 (published as WO 2016/064569), 9 pages (Feb. 2, 2016).
International Search Report and Written Opinion, International Application No. PCT/US2015/050589 (published as WO 2016/048773), 10 pages (Dec. 7, 2015).
International Search Report and Written Opinion, International Application No. PCT/US2016/049918 (published as WO 2017/040792), 10 pages (Nov. 23, 2016).
International Search Report and Written Opinion, International Application No. PCT/US2016/049959 (published as WO 2017/040825), 10 pages (Dec. 9, 2016).
International Search Report and Written Opinion of International Application No. PCT/US2021/040701, (Oct. 27, 2021) 12 pages.
Supplementary European Search Report, EP Application No. 15803994.1, 7 pages (Jan. 22, 2018).
Supplementary European Search Report, EP Application No. 15802457.0, 24 pages (Mar. 14, 2018).
Supplemental European Search Report, EP Application No. 18207568.9, 7 pages (Feb. 4, 2019).
Supplemental European Search Report, EP Application No. 15803186.4, 9 pages (Dec. 17, 2019).
Examination Report, EP Application No. 15709812.0, 5 pages (Jun. 17, 2019).
Supplementary European Search Report, EP Application No. 20166746.6, 7 pages (May 6, 2020).
Supplementary European Search Report, EP Application No. 20168937.9, 8 pages (May 14, 2020).
Supplementary European Search Report, EP Application No. 20179980.6, 8 pages (Jul. 30, 2020).
Extended European Search Report, EP Application No. 20197360.9, 8 pages (Nov. 10, 2020).
Extended European Search Report, EP Application No. 201168887.4, 10 pages (May 21, 2021).
Examination Report for EP Application No. 20179980.6; 4 pages (May 26, 2021).
Examination European Search Report, EP Application No. 157219434.7; 4 pages (Aug. 30, 2021).
Extended European Search Report, EP Application No. 21175762.0; 7 pages (Sep. 17, 2021).
Extended European Search Report, EP Applciation No. 21201681.0; 8 pages (Jan. 24, 2022).

(56) References Cited

OTHER PUBLICATIONS

Extended European Search Report, EP Application No. 21203155.3; 8 pages (Feb. 23, 2022).
Examination Report for EP Application No. 15715589.6; 4 pages (Jun. 13, 2022).
Extended European Search Report, EP Application No. 22162029.7; 8 pages (Jul. 5, 2022).
Examination Report for EP Application No. 15784832.6, 7 pages (Jul. 5, 2022).
Examination Report for EP Application No. 20197360.9, 8 pages (Nov. 28, 2022).
Extended European Search Report for EP Application No. 22202305.3; 7 pages (Jan. 25, 2023).
Examination Report Search Report for EP Application No. 21151341.1; 5 pages (Mar. 10, 2023).
Taiwan Office Action in Taiwan Application No. 110125002, 7 pages (Apr. 8, 2022).
Examination Report for EP Application No. 21748749.5; 5 pages (Feb. 2, 2025).

\* cited by examiner

DYNAMIC CONTROL OF GEARS IN A GEAR PUMP HAVING A DRIVE-DRIVE CONFIGURATION

PRIORITY

The present application is a 371 filing of International Application No. PCT/US2021/040686, which was filed Jul. 7, 2021, and claims priority to U.S. Provisional Patent Application No. 63/049,307 filed on Jul. 8, 2020, which applications are is incorporated herein by reference in their entirety.

TECHNICAL FIELD

Embodiments of the present disclosure generally relate to a system and method for controlling a fluid pump, and more particularly, to a system and method that dynamically controls the torque and/or position of the gears in a gear pump having a drive-drive configuration.

BACKGROUND OF THE INVENTION

Gear pumps are typically used in industrial fluid pumping systems such as, for example, hydraulics systems for industrial equipment, aeronautics, etc. The gear pumps in these systems are generally driver-driven systems in which one gear is coupled to a motor (driver gear) and the driver gear meshes with and drives another gear (driven gear) to transfer fluid from an inlet of the pump to an outlet of the pump. The tolerances between the gears must take into account various parameters, such as variations in operating temperatures and pressures of the working fluid, so that the teeth do not lock as the parameters change. For example, as the temperature of the fluid rises from start-up conditions to full operating temperature, the gears will become larger and the tolerances between the gears must be such that there is always some "play" or "backlash" between the gears so that the gears do not lock. In addition, the tolerances between the gears must allow the driven gear to "self-adjust," within limits, to the forces that it experiences. For example, as the flow and/or discharge pressure changes, the forces on the gear-to-gear contact also changes. Because the driven gear in driver-driven systems is being pushed by the other gear rather than being driven at a precise angular velocity by a motor, the driven gear will automatically adjust for any changes in the forces between the gear teeth provided there is some tolerance between the gears.

In contrast to a driver-driven gear pump, Applicant's U.S. Pat. No. 10,072,676 ("the '676 patent") discloses control of a pump with two fluid drivers (drive-drive pump). The '676 patent discloses a drive-drive pump in which both gears are respectively being driven at a precise angular velocity by respective motors, and the gear-to-gear contact can be maintained by driving one gear "slightly faster" than the other. Obviously, both gears will rotate at the same angular velocity (in the case of a pump having a gear ratio of 1:1). This is because a tooth on the gear being driven slightly faster will contact a tooth on the other gear and both gears rotate at the same angular velocity. In operation, the differential in the speed demand to the two motors is set with the expectation that the contact force between the opposing gear teeth is high enough to maintain a seal between the opposing tooth surfaces during all operating conditions.

In drive-drive systems where the contact force maintains a seal during all operating conditions, neither gear "self-adjusts" to changes in the forces on the gears due to flows, pressures, and temperatures of the hydraulic fluid. For example, as temperatures rise, the gear teeth can get larger and the forces on the gears can increase. Thus, in such drive-drive systems, the motors, the gear teeth, and the tolerances between the gears must be designed for the worst-case stresses, which usually occurs at the flows, pressures, and/or temperatures experienced at the top-rated speed. However, if the drive-drive system is configured to operate in a variety of operating conditions, designing for the worst-case scenario can mean that the drive-drive pump may not be efficient at normal operating conditions and/or may not have the most economical construction. Alternatively, if the drive-drive system is set such that an appropriate contact force for normal operating conditions, the contact force may not be sufficient during worst-case scenarios to maintain proper operation and/or efficiency.

In addition, there is always some variation in the gear teeth dimensions due to the manufacturing process. These variations can lead to the contact force between corresponding meshing teeth to vary. For example, the contact force between the corresponding gear teeth can vary from little to no contact force (e.g., corresponding to a torque that is less than 1 Nm depending on the gear configuration and/or gear size) to excessive contact force (e.g., corresponding to a torque that is greater than 10 Nm depending on the gear configuration and/or gear size) within each revolution of the gears. The variation in the contact force between meshing teeth can lead to uneven and/or excessive wear on the gear teeth and/or to premature failure of the gear teeth. To minimize the variation in the contact force in critical and/or high-rpm pumps (e.g., greater than 6000 rpm), the gears are manufactured to tight tolerances, which raises the cost of the systems.

Further limitation and disadvantages of conventional, traditional, and proposed approaches will become apparent to one skilled in the art, through comparison of such approaches with embodiments of the present invention as set forth in the remainder of the present disclosure with reference to the drawings.

SUMMARY OF THE INVENTION

Preferred embodiments of the present disclosure are directed to control systems that can dynamically synchronize torque and/or dynamically synchronize position between one or more pairs of meshing gear teeth of a gear pump based on feedback from the fluid system and/or a mode of operation of the control system. "Pair of meshing gear teeth" as used herein means a tooth on one gear and a corresponding tooth on the other gear that make contact and/or form a small gap therebetween as the gears rotate and mesh. Depending on the gear ratio, a gear tooth can have one or more corresponding gear teeth on the other gear. "Synchronize position" as used herein means controlling the position of one or more gear teeth relative to its corresponding gear tooth as the pairs of meshing gear teeth rotate. "Synchronize torque" as used herein means controlling a differential torque between the motors to a predetermined value and/or within a predetermined range as one or more pairs of meshing gear teeth make contact during rotation. "Differential torque" as used herein means the difference in the torques of motors and/or the gears.

In an exemplary embodiment, a pump control circuit can dynamically synchronize torque and/or dynamically synchronize position between pairs of one or more meshing gear teeth. The pump control circuit can be configured to adjust a first motor demand signal to a first motor that drives a first gear and/or a second motor demand signal to a second motor that drives a second gear based on a feedback signal corresponding to a torque (e.g., a differential torque) and/or a relative position between the pairs of one or more meshing gear teeth. In some embodiments, the motor demand signals are based on a motor speed. However, in other embodiments, the demand signals can be based on motor current, motor drive frequency, motor voltage, motor power, and/or some other motor parameter. The pump control circuit preferably includes a feedback circuit configured to receive the feedback signal. Preferably, the feedback signal corresponds to a system parameter (e.g., fluid density, viscosity, temperate, pressure, volumetric flow and/or some other property of the fluid being pumped), a pump parameter (e.g., pump rpm, pump temperature, and/or some other pump parameter), a motor parameter (e.g., motor current, motor voltage, motor power, motor frequency, and/or some other motor parameter), a gear parameter (e.g., gear rpm, gear tooth velocity, gear tooth position, encoder feedback, and/or some other gear parameter), and/or another feedback signal. In some embodiments, the feedback signal relates to a differential torque between the first gear and the second gear. In some embodiments, the feedback signal relates to a position of the first gear, a position of the second gear, and/or a relative position of the first gear to the second gear. Of course, other feedbacks, as discussed above, can be used with appropriate circuitry by the pump control circuit to dynamically synchronize torque and/or dynamically synchronize position.

In another exemplary embodiment, a pump system includes a pump assembly that preferably has a pump casing defining an interior volume. The pump assembly can include a first gear and a second gear disposed such that the first gear meshes with the second gear. The pump assembly includes a first motor to drive the first gear and a second motor to drive the second gear. Preferably, the pump system includes a pump control circuit configured to provide a first speed demand signal to the first motor and a second speed demand signal to the second motor. Preferably, the pump control circuit is configured to dynamically synchronize torque based on a torque feedback signal and/or dynamically synchronize position based on a relative position feedback signal by adjusting the first speed demand signal and/or the second speed demand signal.

In another exemplary embodiment, a method of controlling motors of a pump in a drive-drive configuration includes providing a first motor demand signal to a first motor that drives a first gear and providing a second motor demand signal to a second motor that drives a second gear. The method also includes dynamically synchronizing torque based on a torque feedback signal and/or dynamically synchronizing position based on a relative position feedback signal by adjusting the first demand signal and/or the second demand signal.

The summary of the invention is provided as a general introduction to some embodiments of the invention and is not intended to be limiting to any particular fluid-driven actuator assembly or controller system configuration. It is to be understood that various features and configurations of features described in the Summary can be combined in any suitable way to form any number of embodiments of the invention. Some additional example embodiments including variations and alternative configurations are provided herein.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the exemplary embodiments of the invention.

DETAILED DESCRIPTION OF THE PREFERRED EMBODIMENTS

Exemplary embodiments of the present disclosure are directed to drive-drive control systems in which the gears of the pump are driven in modes of operation that include synchronized torque mode operation and/or synchronized position mode operation. Exemplary embodiments of the present disclosure can also be directed to a gear pump that includes two gears for transferring the fluid, with each gear being driven by a respective motor. For example, the pump can be an external gear pump or an internal gear pump, which have a drive-drive configuration.

Preferably, the control system can dynamically synchronize torque and/or dynamically synchronize position between one or more pairs of meshing gear teeth during operation of the gear pump. In some embodiments, the control system controls the gear pump based on feedback such as, for example, a system parameter (e.g., fluid density, viscosity, temperate, pressure, volumetric flow and/or some other property of the fluid being pumped), a pump parameter (e.g., pump rpm, pump temperature, and/or some other pump parameter), a motor parameter (e.g., motor current, motor voltage, motor power, motor frequency, and/or some other motor parameter), a gear parameter (e.g., gear rpm, gear tooth velocity, gear tooth position, encoder feedback, and/or some other gear parameter), and/or another feedback signal. In some embodiments, the pump control system can dynamically synchronize torque between one or more pairs of meshing gear teeth to maintain a torque between the corresponding gear teeth at a predetermined setpoint. For example, the pump control system can be configured to maintain a differential torque between the meshing gear teeth that can be due to, for example, a contact force between the teeth and/or system conditions (e.g., system pressures, flows, temperatures, etc.). Preferably, the differential torque is maintained at a torque setpoint that is based on system conditions and/or an operational condition of the pump. In some embodiments, the torque feedback signal is based on motor current feedback signals from one or both of the motors. In some embodiments, the pump control system can dynamically synchronize position of one or more pair of meshing gear teeth so as to maintain a relative position (also referred to herein as "gap width") between the corresponding teeth to a predetermined setpoint (e.g., a gap width setpoint). Preferably, the predetermined setpoint can be based on an operational condition of the pump such as, for example, a temperature of the fluid being pumped.

Figure 1:
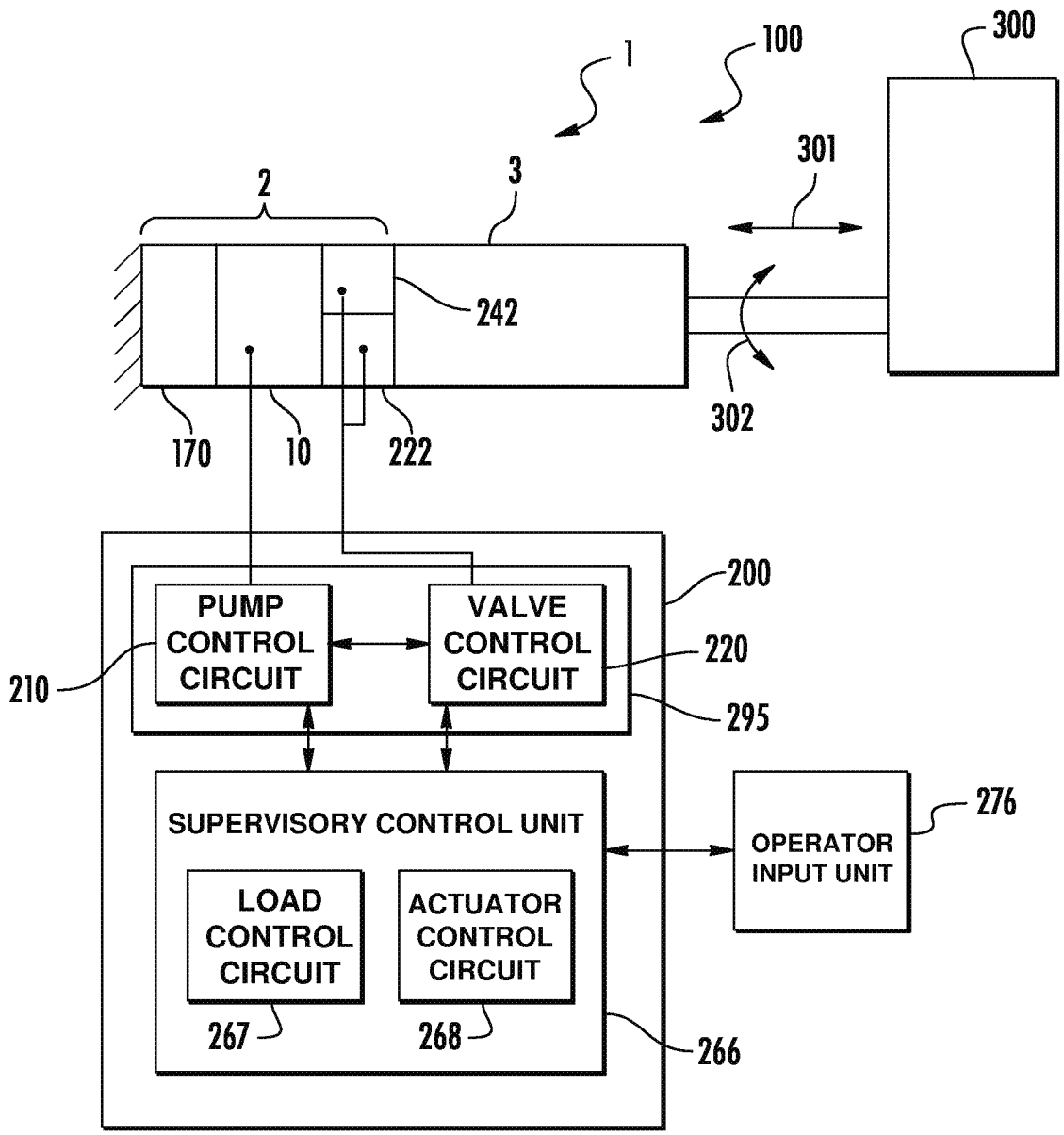
FIG. 1 is a block diagram of fluid-driven actuator system with a preferred embodiment of a fluid-driven actuator assembly and control system.

FIG. 1 shows an exemplary block diagram of a fluid-operated system 100. The fluid-operated system 100 includes a fluid-driven actuator assembly 1 that operates a load 300. The fluid-driven actuator assembly 1 includes a fluid-driven actuator 3, which can be, e.g., a hydraulic cylinder, a hydraulic motor or another type of fluid driven actuator that performs work on an external load, and a pump assembly 2. When the fluid-driven actuator is a linear actuator, such as a hydraulic cylinder, the load 300 can be moved in a linear direction such as, for example, linear direction 301. If the fluid-driven actuator is a rotary actuator, such as a hydraulic motor, the load 300 can be rotated such as, for example, rotational direction 302. The pump assembly 2 can include pump 10, proportional control valve assemblies 222 and 242 and/or storage device 170. The hydraulic actuator 3 can be operated by fluid from pump 10, which can be controlled by an actuator control system 200.

Preferably, the actuator control system 200 includes a drive unit 295 having a pump control circuit 210 that controls pump 10 and/or a valve control circuit 220 that controls proportional control valve assemblies 222 and 242. The actuator control system 200 preferably includes a supervisory control unit 266 that controls the overall operation of the system. The supervisory control unit 266 can include an operator input unit 276 to receive commands from a user. The operator input unit 276 can be, for example, a man-machine interface (e.g., keyboard, monitor, mouse, joystick, and/or another user interface). In some embodiments, the supervisory control unit 266 (and/or another controller) can include a load control circuit 267 that can include the control logic (e.g., hardware, software, algorithms, etc.) for controlling the load 300. In some embodiments, the load control circuit 267 communicates with pump control circuit 210 to operate the load 300. Preferably, the supervisory control unit 266 (and/or another controller) can include an actuator control circuit 268 that can include the control logic (e.g., hardware, software, algorithms, etc.) for controlling the fluid-driven actuator assembly 1. In some embodiments, the actuator control circuit 268 communicates with pump control circuit 210 to operate the fluid-driven actuator assembly 1. The drive unit 295 with the pump control circuit 210 and/or the valve control circuit 220 can include hardware and/or software that interpret parameter feedback signals (e.g., signals related to system pressures, flows, temperatures, valve, actuator, and/or gear positions and/or velocities, motor currents and/or voltage, and/or some other measured parameter(s)) and/or command signals (e.g., flow and/or pressure setpoints and/or some other control signal(s)) from the supervisory control unit 266 and/or the user via input unit 276 and send the appropriate demand signals (e.g., speed, torque, and/or position demand signals and/or some other demand signal(s)) to the pump 10 and the control valve assemblies 222, 242 to position the load 300. For brevity, description of the exemplary embodiments is given with respect to a hydraulic fluid system with a hydraulic pump and a hydraulic actuator (e.g., a hydraulic cylinder, a hydraulic motor, and/or another type of hydraulic actuator). However, the inventive features of the present disclosure are applicable to fluid systems other than hydraulic systems.

In some exemplary embodiments, the pump assembly 2 can include a storage device 170 to store and release the hydraulic fluid as needed. The storage device 170 can also storage and release hydraulic fluid when the fluid density and thus the fluid volume changes due to, for example, a change in the temperature of the fluid (or a change in the fluid volume for some other reason). Further, the storage device 170 can also serve to absorb hydraulic shocks in the system due to operation of the pump 10 and/or valve assemblies 222, 242.

In some embodiments, the pump assembly 2, including proportional control valve assemblies 222 and 242 and storage device 170, can be conjoined with the hydraulic actuator 3 by using, for example, screws, bolts, and/or some other fastening means such that the space occupied by the fluid-driven actuator assembly 1 is reduced. Thus, as seen in FIG. 1, in some exemplary embodiments, the fluid-driven actuator assembly 1 of the present disclosure has an integrated configuration that provides for a compact design. However, in other embodiments, one or all of the components in the fluid-driven actuator assembly 1 such as, for example, the hydraulic pump 10, the hydraulic actuator 3 and/or the control valve assemblies 222 and/or 242, can be disposed separately and operatively connected without using an integrated configuration. For example, just the pump 10 and control valves 222, 242 can be conjoined (or any other combination of devices can be conjoined).

Figure 2:
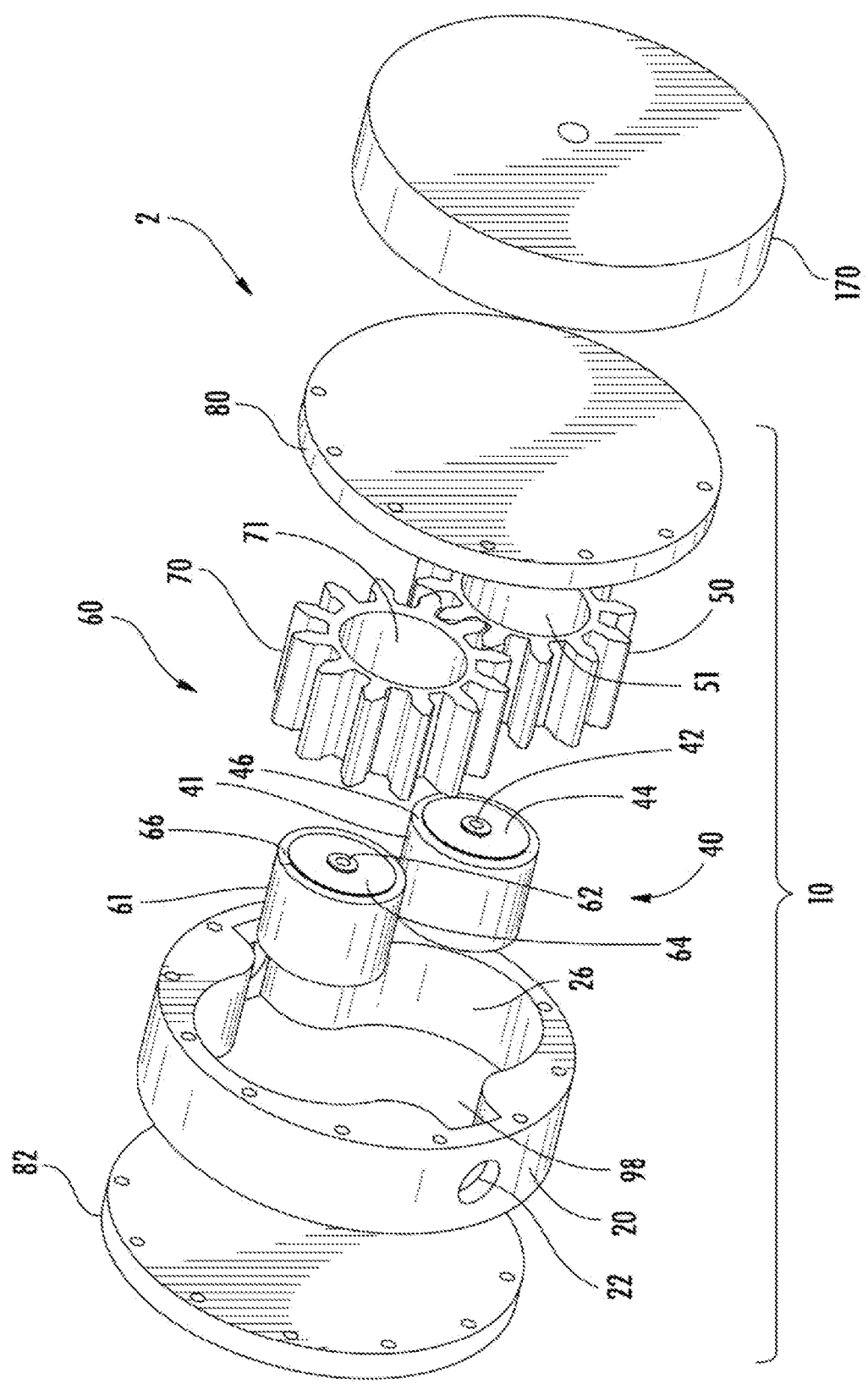
FIG. 2 shows an exploded view of an exemplary embodiment of a pump assembly having an external gear pump and a storage device.
Figure 3:
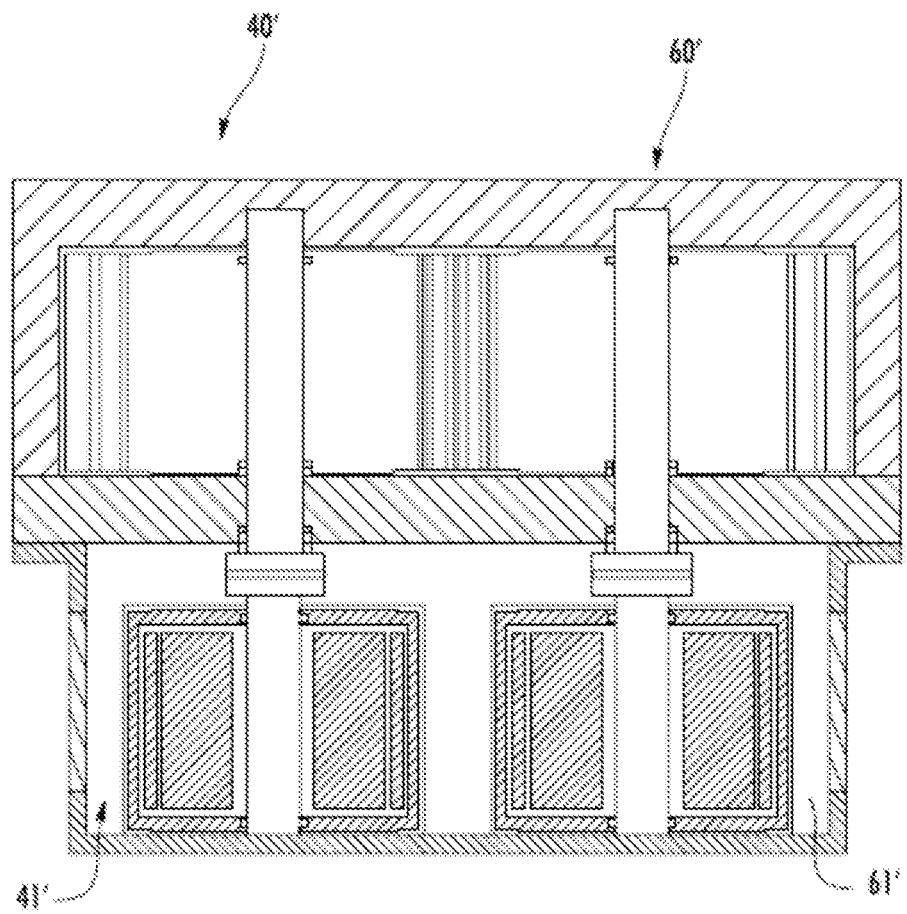
FIG. 3 shows a cross-sectional view of another exemplary embodiment of a pump assembly with a drive-drive configuration and having the motors disposed on the outside of pump interior.

FIG. 2 shows an exploded view of an exemplary embodiment of a pump assembly 2 that can be used with a hydraulic actuator (e.g., a linear actuator and/or a hydrostatic transmission). The pump assembly 2 includes the pump 10 and the storage device 170. For clarity, the proportional control valve assemblies 222 and 242 are not shown. The configuration and operation of pump 10 and storage device 170 can be found in Applicant's U.S. Pat. Nos. 9,228,586 and 10,294,936, which are incorporated herein by reference in their entirety. Thus, for brevity, a detailed description of the configuration and operation of pump 10 and storage device 170 are omitted except as necessary to describe the present exemplary embodiments. The storage device 170 can be, for example, a pressurized vessel (e.g., an accumulator) and can be connected to the port 22 and/or port 24 via means such as, for example, piping, hoses, channels or other types of connections (not shown). The pump 10 includes two fluid drivers 40, 60 that respectively include a prime mover and a fluid displacement member. In the illustrated exemplary embodiment of FIG. 2, the prime movers are electric motors 41, 61 and the fluid displacement members are spur gears 50, 70. In this embodiment, both pump motors 41, 61 are disposed inside the cylindrical openings 51, 71 of gears 50, 70 when assembled. However, exemplary embodiments of the present disclosure cover other motor/gear configurations. For example, FIG. 3 illustrates a cross-sectional view of an embodiment of a pump assembly with the motors 41', 61' of fluid drivers 40' and 60' are disposed on the outside of pump interior. Other exemplary pump configurations can be found in U.S. Pat. Nos. 9,228,586 and 10,294,936.

As seen in FIG. 2, the pump 10 represents a positive-displacement (or fixed displacement) gear pump. The pair of gears 50, 70 are disposed in the interior volume 98. Each of the gears 50, 70 has a plurality of gear teeth 52, 72 extending radially outward from the respective gear bodies. The gear teeth 52, 72, when rotated by, e.g., electric motors 41, 61, transfer fluid from the inlet to the outlet. The pump 10 can be a variable speed and/or a variable torque pump (e.g., motors 41, 61 can be variable speed and/or variable torque) and thus rotation of the gears 50, 70 can be varied to create various volume flows and pump pressures. In some embodiments, the pump 10 is bi-directional (e.g., motors 41, 61 can be bi-directional). In such embodiments, either port 22, 24 can be the inlet port and the other port will be the outlet port, depending on the direction of rotation of gears 50, 70.

The fluid drivers 40, 60 are disposed in an interior volume 98 that is defined by the inner wall 26 of pump casing 20. The shafts 42, 62 of the fluid drivers 40, 60 are disposed between the port 22 and the port 24 of the pump casing 20 and are supported by the plate 80 at one end 84 and the plate 82 at the other end 86. The stators 44, 64 of motors 41, 61 are disposed radially between the respective shafts 42, 62 and the rotors 46, 66. The stators 44, 64 are fixedly connected to the respective shafts 42, 62, which are fixedly connected to the plates 82, 84 of casing 20. The rotors 46,66 are preferably be connected to the stationary shafts 44, 64 via bearings (not shown). The rotors 46, 66 are disposed radially outward of the stators 44, 64 and surround the respective stators 44, 64. In some embodiments, the motors 41, 61 include casings (not shown) and the motors 41, 61 are coupled to gears 50, 70 via the motor casing. Thus, the motors 41, 61 in this embodiment are of an outer-rotor motor arrangement (or an external-rotor motor arrangement), which means that the outside of the motor rotates and the center of the motor is stationary. In contrast, the motors 41' and 61' in the embodiment of FIG. 3 can have an internal-rotor motor arrangement in which the rotor is attached to the rotating central shaft.

As shown in FIG. 2, in some embodiments, the storage device 170 can be mounted to the pump 10 on, for example, the end plate 80 to form one integrated unit. In some embodiments, the storage device 170 can be disposed separately from the pump 10. The storage device 170 can store fluid to be pumped by the pump 10 and supply fluid needed to perform a commanded operation. In some embodiments, the storage device 170 in the pump 10 can be a pressurized vessel that stores the fluid for the system. In such embodiments, the storage device 170 can be pressurized to a specified pressure that is appropriate for the system. During operation, if the pressure at the relevant port 22, 24 drops below the pressure in a fluid chamber (not shown) of the storage device 170, the pressurized fluid from the storage device 170 can be pushed to the appropriate port 22, 24 until the pressures equalize. Conversely, if the pressure at the relevant port 22, 24 goes higher than the pressure of fluid chamber, the fluid from the port can be pushed to the fluid chamber of the storage device 170 via piping, hoses, channels, or other types of connections (not shown). Those skilled in the art understand the configuration and operation of storage devices in hydraulic systems and thus, for brevity, will not be discussed further. While the exemplary embodiments discussed above illustrate only one storage device, exemplary embodiments of the present disclosure can have one or more storage devices.

Figure 4:
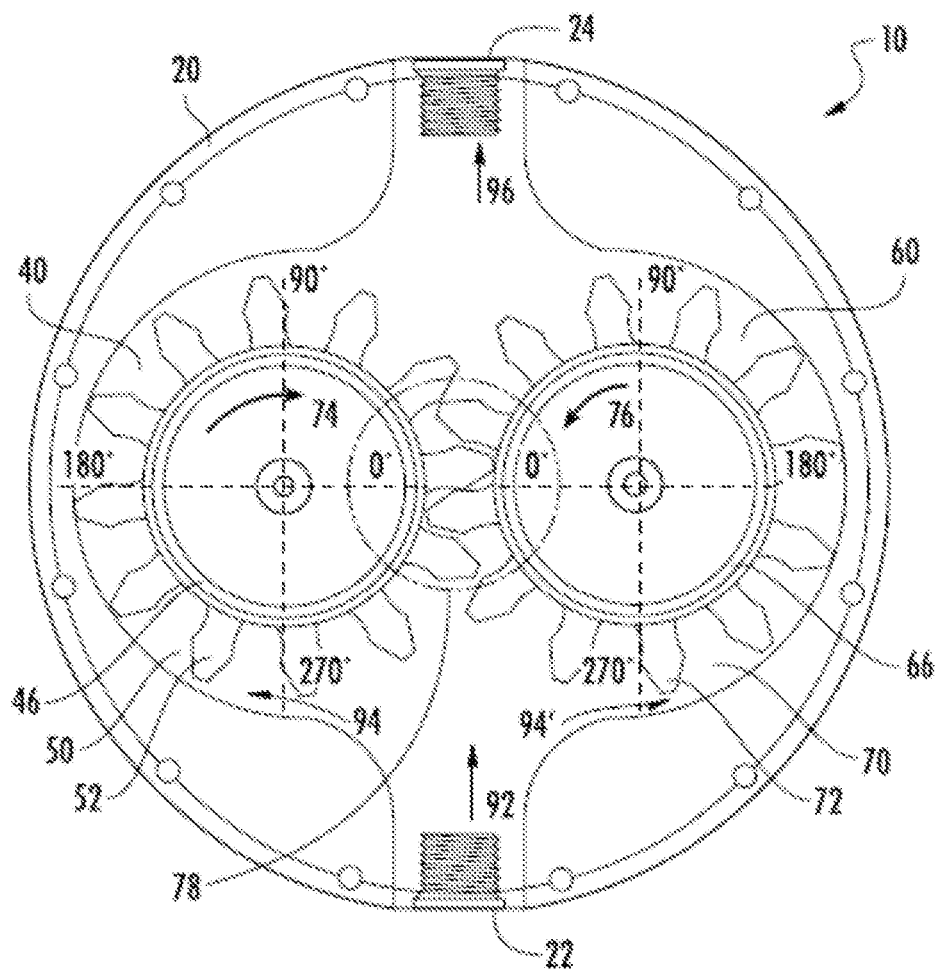
FIG. 4 shows a top cross-sectional view and an exemplary flow path for the external gear pump of FIG. 1.

FIG. 4 illustrates a top cross-sectional view of the external gear pump 10 and an exemplary fluid flow path (see flow arrows 92, 94, 94', 96) for the pump 10 based on the rotation of the gears 50, 70 (see rotation arrows 74 and 76, respectively). While the motors 41 and 61 are shown disposed in the interior volume 98, in some embodiments, one or both of the motors can be disposed external to the interior volume 98. Preferably, both gears 50, 70 are respectively independently driven by the separately provided motors 41, 61. In the embodiment of FIG. 4, the gear ratio is 1:1 and for purposes of clarity and brevity, exemplary embodiments of the present disclosure have a gear ratio of 1:1. However, the present disclosure is applicable to the control of pumps having gear ratios other than 1:1 and those skilled in the art will understand how to apply the inventive concepts of the present disclosure to the control of pumps having a variety of gear ratios.

Preferably, the pump control circuit 210 is configured to operate the pump in various mode of operation such as, for example, controlling the process (e.g., controlling the flow and/or pressure in the fluid system 1 to an appropriate operational setpoint or range) and/or controlling the position of the actuator 3 (e.g., positioning the actuator at a predetermined position). It should be noted that the modes of operation are not necessarily mutually exclusive. For example, positioning a linear actuator from near one end of its travel to near the other end of its travel can include the pump control circuit 210 controlling the flow and/or pressure of the fluid being pumped to an operational setpoint or range while ultimately setting the actuator position at a predetermined position setpoint.

Figure 5:
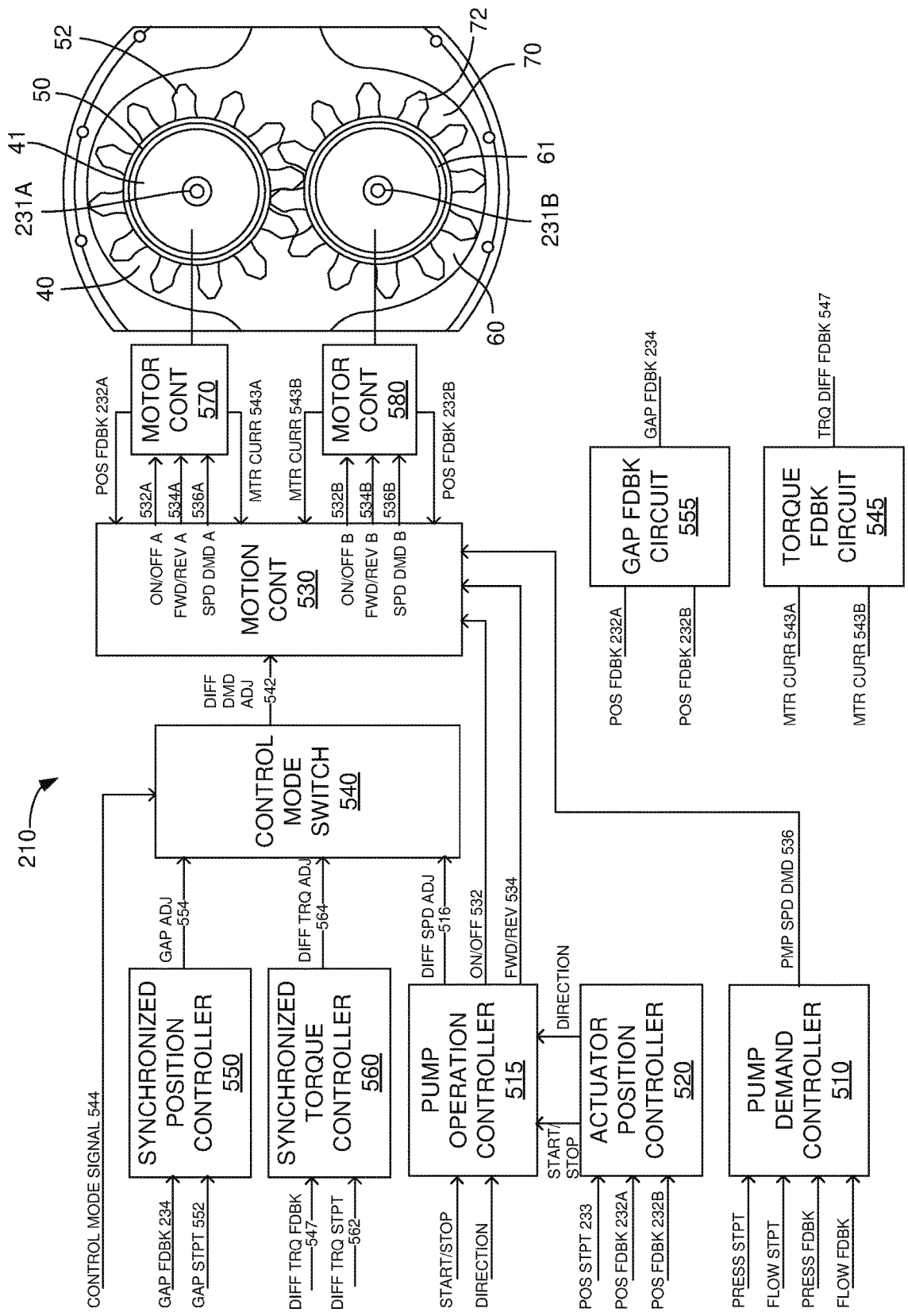
FIG. 5 is a schematic block diagram of a pump control system in accordance with an embodiment of the present disclosure.

As seen in FIG. 5, the pump control circuit 210 can include a pump demand controller 510, a pump operation controller 515, an actuator position controller 520, a motion controller 530, a control mode switch 540, a synchronized position controller 550, a synchronized torque controller 560, a gap feedback circuit 555, a torque feedback circuit 545, and/or motor controllers 570, 580. The pump operation controller 515 can receive pump operation signals such as, for example, a pump start/stop signal and/or a pump direction signal from, for example, supervisory control unit 266, the drive unit 295 and/or another controller. In some embodiments, the pump operation controller 515 can also receive a pump start/stop signal and/or a pump direction signal from the actuator position controller 520 (discussed further below). Based on the received signals, the pump operation controller 515 can output an ON/OFF signal 532 to start or stop the pump 10 and/or a FWD/REV signal 534 to set the direction of rotation of the pump 10. The signals 532, 534 can be sent to the motion controller 530, which then outputs individual ON/OFF signals 532A, 532B and FWD/REV signals 534A, 534B to the respective motor controllers 570 and 580, which operate motors 41, 61. In some embodiments, the signals 532, 534 can be sent directly to the motor controllers 570, 580. A power supply (not shown) can supply the necessary power to motor controllers 570 and 580 so that the controllers 570 and 580 can output the required current to drive the respective motors 41, 61. The motor controllers 570, 580 can include the hardware such as inverters, IGBT switches, SCRs and associated controllers to output the required current to the motors 41, 61 based on individual speed demand signals 536A, 536B, respectively. Preferably, the motor controllers 570, 580 are variable-speed motor controllers. Variable-speed motor controllers are known to those skilled in the art and can be "off-the-shelf" products. Thus, for brevity, the configuration of the variable-speed motor controllers will not be further discussed.

In some embodiments, the individual speed demand signals 536A, 536B can be based on a desired average contact force between the gear teeth. For example, the pump operation controller 515 can output a differential speed adjustment signal 516 to the control mode switch 540. Preferably, the differential speed adjustment signal 516 corresponds to a desired average contact force between the pairs of meshing gear teeth. The differential speed adjustment signal 516 can be generated internally by the pump operation controller 515 and/or received from the control unit 266 and/or the drive unit 295 (and/or another controller). Based on the control mode, the differential speed adjustment signal 516 can be output as differential demand adjustment signal 542 from control mode switch 540 to motion controller 530, which uses the differential demand adjustment signal 542 to adjust the individual speed demand signals 536A, 536B.

In some embodiments, the pump demand controller 510 can provide a pump speed demand signal 536 that is used for controlling, for example, the angular velocity of the gears 50, 70 based on, for example, a desired flow and/or pressure in the system. The pump demand controller 510 can ensure that the flow and/or pressure is maintained at the respective flow and/or pressure setpoint during the various operating modes of the pump control system. An exemplary embodiment of the pump demand controller 510 can be found in U.S. patent application Ser. No. 15/756,928, Titled "System to Pump Fluid and Control Thereof," which is incorporated herein in its entirety. However, the type of control scheme for generating a pump speed demand signal 536 is not limiting and exemplary embodiments of the present disclose can be directed to other types of control schemes that generate a pump speed demand signal for controlling flow and/or pressure in the fluid system (e.g., at the output of the pump 10). Preferably, the pump speed demand signal 536 can be output to the motion controller 530. Based on the pump demand signal 536 and the differential demand adjustment signal 542, the motion controller 530 generates and outputs the individual pump speed demand signals 536A and 536B to motor controllers 570 and 580, respectively.

In some embodiments, depending on the mode of operation of the pump control system, the actuator position controller 520 can precisely control the position of the motors 41, 61 to set the position of the fluid-driven actuator 3. Preferably, the actuator position controller 520 can set the position of the fluid-driven actuator 3 based on a reference point (e.g., a fixed reference point). As seen in FIG. 5, the actuator position controller 520 receives an actuator position setpoint signal 233 (e.g., from control unit 266, drive unit 295, and/or another controller) and one or both position feedback signals 232A, 232B from the respective position sensors 231A, 231B. Preferably, when there is a deviation from the actuator position setpoint signal 233 by one or both of the feedback signals 232A and 232B, the actuator position controller 520 can output start/stop and direction signals to start the motors 41, 61 (e.g., via the ON/OFF signals 532, 532A, and/or 532B) and, if applicable, also provide a direction of rotation signal (e.g., via the FWD/REV signals 534, 534A, and/or 534B). When one or both of the feedback signals 232A and 232B matches the actuator position setpoint signal 233, the actuator position controller 520 can then stop the motors 41, 61 (e.g., via the ON/OFF signals 532, 532A, and/or 532B). Thus, based on a difference between the position setpoint signal 233 and the one or both of the feedback signals 232A 232B, the actuator position controller 520 can appropriately output the start/stop and direction signals to the pump operation controller 515 (and/or directly to the motion controller 530 and/or directly to the motor controllers 570 and 580) to set the position of the actuator 3.

In some embodiments, the actuator position setpoint signal 233 can be configured to correspond to a desired position of a gear 50 and/or gear 70 relative to a fixed reference point (e.g., a point on the pump casing, a point on the motor shaft, or some other point on the pump that does not rotate). For example, each motor 41, 61 (and thus the attached gear) can be set to an angular position that corresponds to a 360-degree position on the motor shaft 42, 62 (see FIG. 4). Accordingly, in some embodiments, the position feedback signals 232A and 232B can correlate the position of one or more gear teeth 52, 72 relative to a 360-degree position on shaft 42, 62 (and/or another fixed location). In some embodiments, the 360-degree rotational position of each gear 50, 70 can be controlled by the respective motor controllers 570, 580 to within 3.6 seconds of arc. Preferably, when controlling the angular velocity of the gears 50, 70, the respective motor controllers 570, 580 can control the angular velocity to within an accuracy of ±0.001 rpm. In operation, if the fluid-driven actuator 3 is required to move the load 300 a fixed distance (e.g., a liner distance for a hydraulic cylinder and an angular movement for a hydraulic motor), the control unit 266 and/or the drive unit 295 (and/or another controller) can be configured to determine the precise number of rotations and/or a fraction of a rotation required by the motors 41, 61 (and thus the gears 50, 70) to achieve the desired movement of the fluid-driven actuator 3. For example, the control unit 266 and/or the drive unit 295 (and/or another controller) may determine that, to achieve the desired movement of the hydraulic cylinder or the hydraulic motor, the pump will need to rotate +90°, with, for example, a "+" representing a pump flow out, e.g., port 24 and a "−" representing a pump flow out, e.g., port 22. In this case, the control unit 266 and/or the drive unit 295 (and/or another controller) will add 90° to the actuator position setpoint signal 233 going to the actuator position controller 520. The actuator position controller 520 compares the difference between the actuator position setpoint 233 and the position feedback signal 232A and/or 232B to determine whether the pump should be rotated and, if so, in which direction. If a repositioning of the fluid-driven actuator 3 is necessary, the actuator position controller 520 outputs a start signal to turn on the pump 10 (e.g., via pump operation controller 515 and/or motion controller 530 using the ON/OFF signals 532, 532A, and/or 532B) and the appropriate direction of rotation signal for the pump 10 (e.g., via pump operation controller 515 and/or motion controller 530 using the FWD/REV signals 534, 534A, and/or 534B). When the position feedback signal 232A and/or 232B from the fluid drivers 40, 60 indicates that the motors/gears have rotated 90°, the actuator position controller 520 sends a stop signal to turn off the pump 10 (e.g., via pump operation controller 515 and/or motion controller 530 using the ON/OFF signals 532, 532A, and/or 532B). Although one actuator position controller 520 is shown in FIG. 5, in some embodiments, two actuator position controllers (e.g., one controller corresponding to each motor) that communicate with each other can be used, e.g., configured in a master/slave arrangement. Of course, other control schemes can be used by actuator position controller 520 to set the position of the fluid-driven actuator 3. Preferably, during the travel time of the fluid-driven actuator 3 (e.g., the time the motor controllers 570, 580 are operating their respective motors 41, 61), the angular velocity of the motors 41, 61 and thus the gears 50, 70 are controlled using speed demand signals 536A and 536B, respectively, which, as discussed above, can be based on the speed demand signal 536 and the differential demand adjustment signal 542.

In some embodiments, the position setpoint signal 233 and/or position feedback signals 232A, 232B correspond to an angle that is within 360 degrees and the number of turns that the gears 50, 70 are required to turn are tracked separately. However, in other embodiments, the position setpoint signal 233 and/or position feedback signals 232A, 232B can correspond to angles that are greater than 360 degrees. For example, if the pump 10 is controlling the position of a linear actuator and it takes 100 turns of the motors 41, 61 to go from minimum extension to full extension on the linear actuator, the motion controller 530 and/or the sensors 231A, 231B can be configured such that the minimum position on the linear actuator corresponds to 0 degrees and the maximum position on the linear actuator corresponds to 36000 degrees. Thus, to move the linear actuator open by an amount corresponding to two full turns on the gears 50, 70, the position setpoint signal 233 can be increased by +720 degrees, for example, by control unit 266 and/or the drive unit 295 (and/or another controller). Of course, other minimum degree values and maximum degree values can be used.

In some systems, during operation of the pump, the pump control system can maintain a fixed speed difference on the individual motors to generate a desired average contact force that can correspond to a force that seals the backflow between the gears, for example. Preferably, the pump operation controller 515 can generate a differential speed adjustment signal 516 that corresponds to the desired contact force, and the differential speed adjustment signal 516 can be sent to the control mode switch 540. Based on the control mode (discussed further below), the control mode switch 540 can select the differential speed adjustment signal 516 and output a differential demand adjustment signal 542 based on the differential speed adjustment signal 516.

As seen in FIG. 5, the motion controller 530 can receive a pump speed demand signal 536 from the pump demand controller 510 and the differential demand adjustment signal 542 from the control mode switch 540. Along with the ON/OFF and FWD/REV signals discussed above and based on the pump speed demand signal 536 and the differential demand adjustment signal 542, the motion controller 530 can output individual motor speed demand signals 536A and 536B to motor controllers 570 and 580. The speed demand signals 536A, 536B set the appropriate angular velocity of the respective motors 41, 61 based on a desired flow and/or pressure, or more specifically, the speed demand signals 536A, 536B set the gear speed of the gears being driven based on a desired flow and/or pressure. As used herein, "gear speed" refers to the tip velocity of the gear tooth. Thus, the gear speed for each gear can be the same while the angular velocities can be different. For example, if the pump has a gear ratio of 2:1, the speed demand signal to the motor driving the smaller gear can be approximately twice the speed demand signal the larger gear, adjusting for the desired contact force. Of course, instead of the speed demand signals 536A, 536B taking into account the gear ratio of the pump 10, the motor controllers 570 and 580 can be configured to take into account the gear ratio by appropriately modifying the signals to the motors 41, 61. For clarity, speed demand signals 536A and 536B, as used herein, correspond to the gear speed. Thus, if speed demand signals 536A and 536B are equal, the tip speeds of the teeth 52, 72 are equal (even if the angular velocities of the gears may be different due to gear ratios other than 1:1).

The motion controller 530 can generate the speed demand signals for motors 41 and/or 61 based on the speed demand signal 536 and then modify one or both of the motor speed demand signals for the motors 41, 61 based on the differential demand adjustment signal 542 before outputting the signals as speed demand signals 536A, 536B. Thus, in some embodiments, the differential demand adjustment signal 542 is used to create a difference in the speed demand signals to the motors 41, 61 (also referred to herein as "differential speed demand"). Preferably, the differential speed demand corresponds to the desired average contact force when the control mode switch 540 selects the differential speed adjustment signal 516. Based on the differential speed demand, the speed demand signals 536A and 536B to the motor controllers 570 and 580 can be set by the motion controller 530 such that one gear is rotated slightly faster than the other gear. However, because the gear teeth are in a meshing configuration, the gears will rotate at the same speed and the difference in the speed demands produces a contact force between opposing gear teeth 52, 72 (assuming a gear ratio of 1:1). In some control systems, the differential speed demand is fixed and preferably relates to a predetermined contact force between pairs of meshing gear teeth. For example, the differential speed adjustment signal 516 from the pump operation controller 515 can correspond to a predetermined average contact force. The differential speed adjustment signal 516 is used by the motion controller 530 (via the differential demand adjustment signal 542) to adjust one or both of the speed demand signals 536A and 536B such that a fixed differential speed demand corresponding to the predetermined average contact force is generated. In some embodiments, the fixed speed differential adjustment can be a value based on the type of pump, gear, and/or motor. Preferably, the fixed differential speed demand produces an average contact force that is sufficient to seal the backflow or leakage of the fluid path from the outlet port to the inlet port of the pump 10 and keeps the corresponding torque within an acceptable torque range for the pump motor and/or pump gears. For example, depending on the configuration of the pump, the predetermined differential speed demand can correspond to a torque value in a range of about 1.0 Nm to 10 Nm and more preferably 1.0 Nm to 6 Nm. Of course, the acceptable torque value and/or range can be different depending on, for example, the size and/or rating of the pump, size and/or configuration of the gears, size and/or configuration of the motors, and/or some other pump/gear/motor parameter. Accordingly, when used, the fixed differential speed demand can be maintained during operation of the pump 10 as the pump demand signal 536 ramps the speed of the motors up and down. However, a fixed differential speed demand does not typically provide a uniform contact force and/or torque between the pairs of meshing gear teeth. This is because the manufacturing tolerances for the gear teeth can produce gear teeth having dimensions that are not uniform. The variation in the gear teeth dimensions can result in contact forces that generate torques that are less than 1 Nm and/or greater than 10 Nm as the gears rotate. Torques less than 1 Nm can result in inefficient operation due to high backflow or leakage and torques greater than 10 Nm can result in high stresses and/or wear on the teeth. Thus, in such systems, it is possible that the torques on individual gear teeth can either be too much or too little during operation of the pump. In addition to the issues with non-uniform gear teeth dimensions, the fixed differential speed demand will not to take into account changes and/or fluctuations in the fluid pressure, mechanical vibrations of the pump, electrical/magnetic variations in the motors and/or other disturbances during operation of the equipment that can affect the torques of the meshing gear teeth. Further, during some modes of operation, it may be desirable to run the pump "inefficiently" to rapidly warm the operating fluid. For example, the pump can be run with a gap between the corresponding pairs of meshing gear teeth to heat up the working fluid. Accordingly, in such cases, a fixed differential speed demand may not be desirable.

In some exemplary embodiments of the present disclosure, during operation of the pump 10, rather than being fixed, the differential speed demand of the speed demand signals 536A, 536B can be dynamically controlled during operation of the pump 10 based a desired differential torque and/or a desired gap width between one or more pairs of meshing gear teeth 52, 72 of the gear pump 10. For example, in some embodiments, the pump control circuit 210 can be configured to operate in synchronized torque mode operation to dynamically synchronize torque between one or more pairs of meshing gear teeth to generate and/or maintain a predetermined differential torque between the meshing gear teeth. In addition, in some embodiments, the pump control circuit 210 can be configured to operate in synchronized position mode operation to dynamically synchronize position between one or more pairs of meshing gear teeth to generate and/or maintain a predetermined gap width between the meshing gear teeth. In some embodiments, the pump control unit 210 includes a control mode switch 540 that, based on the value of the received control mode signal 544, places the pump control unit 210 in synchronized torque mode operation, synchronized position mode operation, or a fixed speed difference mode of operation (discussed above). Preferably, the value of the control mode signal 544 can be controlled by the supervisory control 266 and/or the drive unit 295 (and/or another controller).

When the pump control unit 210 is in synchronized torque mode operation, the output of the synchronized torque controller 560 determines the differential speed demand. For example, the control mode signal 544 can be set such that the control mode switch 540 selects the differential torque adjustment signal 564 from synchronized torque controller 560. Preferably, the synchronized torque controller 560 is configured such that the differential torque adjustment signal 564 (and thus the differential demand adjustment signal 542) can dynamically change to maintain the differential torque between the pairs of meshing teeth 52, 72 to an acceptable value and/or to be within an acceptable range. In some embodiments, the synchronized torque controller 560 receives a differential torque setpoint signal 562 and a differential torque feedback signal 547 from the torque feedback circuit 545. Preferably, the synchronized torque controller 560 compares the differential torque feedback signal 547 and the differential torque setpoint signal 562 and outputs a differential torque adjustment signal 564 that is based on the comparison. For example, the synchronized torque controller 560 can include look-up-table (LUT) or other data structure, a proportional circuit, proportional-integral (PI) circuit, a proportional-integral-derivative (PID) circuit, and/or some other controller or circuit that provides an output signal corresponding to the difference between the differential torque setpoint signal 562 and the differential torque feedback signal 547. Preferably, the value of the differential torque setpoint signal 562 can correspond to an acceptable torque differential value and/or be within an acceptable torque differential range for the meshing gear teeth. The differential torque setpoint signal 562 can be set by the supervisory control 266 and/or the drive unit 295 (and/or another controller). Preferably, the pump control circuit 210 includes a torque feedback circuit 545 that determines the torque differential between the pairs of meshing gear teeth. In some embodiments, the torque differential can be calculated based on gear dimensions, motor currents (e.g., a difference in the motor currents), and/or changes in one or both motor currents as the pairs of meshing gear teeth 52, 72 contact each other. For example, the torque differential can be determined by monitoring the motor current 543A from motor 41 and motor current 543B from motor 61 and calculating the differential torque between the two motors. The differential torque feedback signal 547 can be based on instantaneous and/or average changes in the difference in the motor currents and/or in one or both motor currents as the pairs of meshing gear teeth 52, 72 contact each other. In other embodiments, the torque differential feedback signal can be based on direct torque measurements (e.g., mechanical and/or electrical), voltage measurements, power measurement, and/or some other type of measurement that can provide an indication of the torque differential between pairs of meshing gear teeth 52, 72. In some embodiments, a differential torque feedback signal can be calculated by the motion controller 530. For example, the motor currents 543A and 543B can be input to the motion controller 530, which then calculates the differential torque feedback signal.

When the control mode signal 544 corresponds to synchronized torque mode operation, the control mode switch 540 selects the differential torque adjustment signal 564 and outputs a differential demand adjustment signal 542 that corresponds to the differential torque adjustment signal 564. As seen in FIG. 5, the motion controller 530 receives the differential demand adjustment signal 542 and can adjust one or both speed demand signals 536A and 536B based on the differential demand adjustment signal 542. That is, based on the pump demand signal 536 and the differential demand adjustment signal 542, the motion controller 530 generates a differential speed demand and outputs individual pump demand signals 536A and 536B to motor controllers 570 and 580, respectively, based on the differential speed demand. During operation of the pump 10 in synchronized torque mode operation, the synchronized torque controller 560 adjusts the differential torque adjustment signal 564 to maintain the differential torque feedback signal 547 at the differential torque setpoint signal 562. Accordingly, rather than having a fixed value, in synchronized torque mode operation, the differential speed demand is adjusted to dynamically synchronize torque between one or more pairs of meshing gear teeth 52, 72 of the gear pump 10. Preferably, the differential speed demand is adjusted such that, as the gears 50, 70 rotate and contact each other, the differential torque is controlled to a predetermined value and/or to be within a predetermined range (e.g., a value within and/or a range from 1 Nm to 10 Nm depending on the configuration of the pump and/or operating conditions). The differential torque value can correspond to an instantaneous value, an average value, and/or some other calculated value. Preferably, the speed demand signal 536A or 536B corresponding to one of the gears 50, 70, respectively, is set higher than the other based on the differential torque adjustment signal 564. In some embodiments, a direction of the torque adjustment (e.g., the speed demand for gear 50 being faster than gear 70 or the speed demand for gear 70 being faster than gear 50) can be changed as desired. For example, the adjustment direction can be alternated at every start of the pump 10, after a predetermined number of starts on the pump 10, based on running hours, or some other criteria to, for example, even the wear (uniform wear) on each side of a gear tooth 52, 72. The adjustment direction indicator can be a separate signal and/or embedded into the differential torque adjustment signal 564 in some manner. For example, the sign "+" or "−" of the differential torque adjustment signal 564 can correspond to which gear has the faster speed demand. The synchronized torque controller 560, control mode switch 540, and/or the motion controller 530 can include the hardware and/or algorithms, set of instructions, and/or program code that can be executed by a processor to dynamically adjust one or both of the speed demand signals 536A and 536B during operation of the pump 10 in the synchronized torque mode operation.

In some exemplary embodiments, the differential torque setpoint signal 562, which is used by the synchronized torque controller 560 to control the differential speed demand, can be based on a desired slip factor (or slip coefficient or slip flow coefficient), the operating conditions (e.g., pressure, flow, temperature), gear parameters (e.g., gear profile, mechanical stress limits of the gear teeth, or some other gear parameter), motor parameter (e.g., currents, voltages, power, or some other motor parameter), and/or some other operational or physical parameter. In some embodiments, for a gear ratio of 1:1, the differential speed demand can be controlled in a range of 0.0001 to 0.001 deg/sec, for example. In some embodiments, depending on the configuration of the pump 10, the differential speed demand can be controlled to produce a differential torque in a range between 1 Nm to 10 Nm, more preferably, in a range of 1 Nm to 6 Nm, and even more preferably, between 2 Nm and 4 Nm. In some embodiments, depending on the configuration of the pump 10, the differential speed demand can be controlled to provide an average differential torque that is about 3 Nm±0.1 Nm. In some embodiments, differential torque feedback signal 547 can be based on monitoring the difference in torque between one or more representative pairs of meshing gear teeth. Preferably, the differential torque between the representative pairs can be controlled based on a differential torque setpoint signal 562 that is set such that a variance in the differential torques (e.g., variances in torques due to manufacturing tolerances and/or process variances) for the remaining pairs of meshing gear teeth fall within an acceptable differential torque range. For example, the differential torque setpoint signal 562 can be set (e.g., 3 Nm) such that controlling the differential torques of the representative pairs will mean that the differential torques of the remaining meshing gear teeth will fall within an acceptable range (e.g., between 1 Nm to 6 Nm). In some embodiments, the differential torques between all pairs of meshing gear teeth can be monitored. In some embodiments, the monitored torque values used to control the differential speed demand can be instantaneous and/or average differential torque values.

In some embodiments, the synchronized torque controller 560 can make dynamic adjustments to the differential speed demand based on an average torque feedback signal derived from data corresponding to one or more revolutions of the gears 50, 70 for all meshing pairs and/or representative pairs. For example, in some embodiments, the synchronized torque controller 560 can be configured to output the differential torque adjustment signal 564 based on a differential torque feedback signal 547 that represents an average of the differential torque over one or more revolutions for all meshing pairs and/or for representative pairs. However, while dynamically adjusting the differential speed demand based on the average differential torque provides advantages over a fixed differential speed demand, the differential torque values for at least some individual pairs of meshing gear teeth can still fall outside of acceptable limits (e.g., due to variations in the gear tooth dimensions and/or process variations and/or for some other reason). That is, even if the average differential torque of the meshing pairs (or of the representative pair(s)) falls within acceptable limits, the differential torque between some individual pairs of meshing gear teeth can still fall outside acceptable limits (e.g., less than 1 Nm and/or greater than 10 Nm).

Because such variations in the differential torque values can exist, in some embodiments, the differential torque between each pair of meshing gear teeth 52, 72 can be monitored and one or both of the speed demand signals 536A, 536B can be dynamically adjusted during operation of the pump 10 on a tooth-by-tooth basis. For example, in some embodiments, the motion controller 530 (and/or another controller) can be configured to keep the differential torque of all the meshing pairs within acceptable limits on a tooth-by-tooth basis. Preferably, the differential torque adjustment signal 564 is used by the motion controller 530 (e.g., via differential demand adjustment signal 542) to generate an intermediate or base differential speed demand for the speed demand signals 536A and 536B. Similar to the differential speed demand discussed above, the base differential speed demand can be based on the pump demand signal 536 and the differential torque adjustment signal 564 (e.g., via differential demand adjustment signal 542) and can correspond to an average differential torque for the meshing teeth. However, after the base differential speed demand is used to generate a base speed signal for motor 41 and a base speed signal for motor 61, the base speed signals for motors 41 and 61 can be further modified based on tooth-by-tooth adjustments to generate the individual speed demand signals 536A and 536B that are output to motor controllers 570 and 580, respectively. That is, as the pump 10 operates, the base speed signal for motor 41 and/or motor 61 is modified based on individual tooth data (e.g., predetermined data) on a tooth-by-tooth basis to generate the speed demand signals 536A and 536B. In some embodiments, the tooth-by-tooth adjustments to the base speed signal for motor 41 and/or motor 61 can be based on factory calibrations of the pump 10 and/or in-service calibrations. The calibration data can relate to individual tooth dimensions, operational data such as motor currents and voltages, and/or process data such as pressures, flows, slip factors, etc. The tooth-by-tooth adjustments to the base speed signal for motor 41 and/or motor 61 can be stored in a data structure such as, for example, a LUT or some other structure. Preferably, the tooth-by-tooth adjustments used in generating one or both of the speed demand signals 536A, 536B correct for deviations in the torque values for each pair of meshing gear teeth as they converge in the meshing region 78.

Preferably, to adjust for the torque variances on a tooth-by-tooth basis, the motion controller 530 (and/or another circuit) is configured to make very small incremental adjustments and/or momentary adjustments in the angular velocity of the motors 41, 61 via speed demand signals 536A, 536B, respectively, based on the tooth-by-tooth adjustment data. To this end, in some embodiments, the motion controller 530 (and/or another controller) can receive high resolution feedback (e.g., via a high-resolution encoder) of the position and/or angular velocity of the motors 41, 61. For example, sensors 231A and/or 231B can provide high resolution feedback of the position and/or angular velocity to the respective motor controllers 570 and 580. Preferably, the motion controller 530 (and/or another controller) can receive one or both of the position feedback signals 232A and 232B (and/or velocity feedback) from motor controllers 570 and 580 and determine the position of each tooth relative to a reference point and/or calculate the angular velocity of the motor 41, 61 from the position feedback signals 232A and 232B. Preferably, the motion controller 530 (and/or another controller) can adjust the motor angular velocity and thus the gear angular velocity in increments of ±0.001 radians/sec via, for example, speed demand signals 536A and/or 536B.

Preferably, the motion controller 530 (and/or another controller) can correlate the position of each pair of meshing gear teeth and the tooth-by-tooth adjustment for the pair. As each pair of meshing gear teeth enter the meshing region 78 as determined by, for example, the position feedback signal 232A and/or 232B, the motion controller 530 (and/or another controller) can momentarily modify one or both of the base speed signals for motors 41 and 61, as appropriate, using the tooth-by-tooth adjustment data to generate the final differential speed demand of the speed demand signals 536A and 536B. For example, the base speed signal for motor 41 and/or motor 61 can be bumped up or down for a moment during the time the pair of meshing gear teeth are in the meshing region 78. After the pair of meshing gear teeth 52, 72 start to exit the meshing region 78, the modified base speed signal for motor 41 and/or 61 is reset to the base speed signal value and the process repeats for the next pair of meshing gear teeth 52, 72. Table 1 shows an example of tooth-by-tooth adjustments to each base speed signal by the motion controller 530 (and/or another controller).

TABLE 1

| Meshing Teeth Pair | Adjustment to base speed signal for motor 41 | Adjustment to base speed signal for motor 61 |
|---|---|---|
| MP1 | 0 | −2 |
| MP2 | 0 | 0 |
| MP3 | 0 | +1 |
| MP4 | 0 | −1 |
| ... | ... | ... |
| MPn | 0 | +1 |

In Table 1, the tooth-by-tooth adjustments to the base speed signal for motor 41 and/or motor 61 are given in positive or negative integer increments. The integers (e.g., 0, ±1, ±2, . . . ) can correspond to a speed percentage change (e.g., each integer value can represent, e.g., a 0.01% incremental change to the speed demand), an angular velocity change (e.g., each integer value represent, e.g., a 0.001 radians/sec incremental change), or some other incremental change to the base speed signal for the respective motor.

Figure 6A:
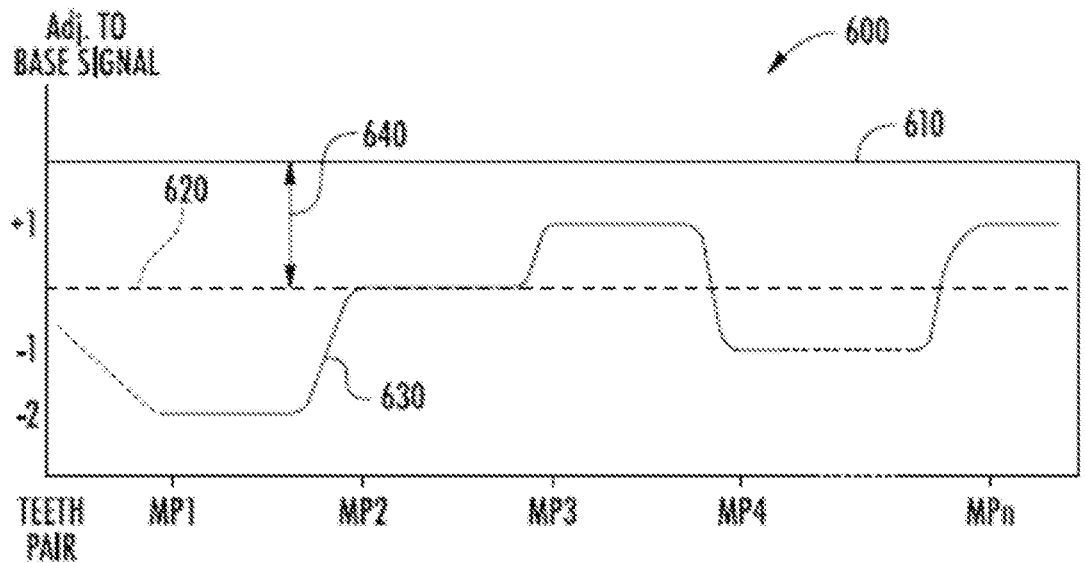
FIG. 6A illustrates an exemplary graph of speed demand vs. meshing gear pair for an exemplary operation of an external gear pump.
Figure 6B:
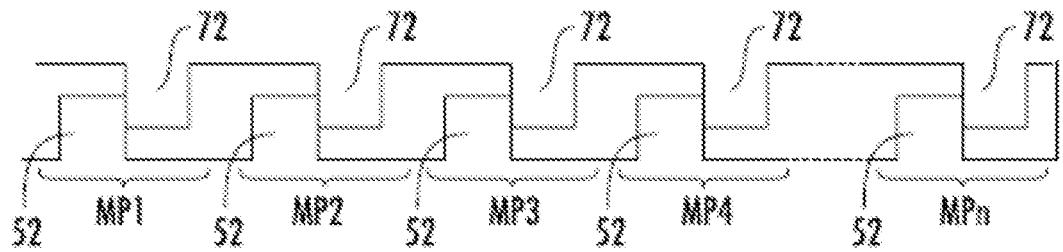
FIG. 6B illustrates pairs of meshing teeth corresponding to the graph of FIG. 6A.

FIG. 6A illustrates an exemplary graph 600 of the adjustments shown in Table 1 for an exemplary operation of the pump 10. FIG. 6B illustrates the interface of the meshing teeth pairs MP1-MPn of the x-axis of graph 600. As seen in FIG. 6A, the base speed signal 610 for motor 41 can be at a value that is appropriate for the desired flow and/or pressure corresponding to the pump demand signal 536 and the differential torque adjustment signal 564. In FIG. 6A, because the adjustment is 0 for motor 41 (see Table 1) for all meshing pairs MP1-MPn, the base speed signal 610 will be the speed demand signal 536A for motor 41. For purposes of explanation and clarity, the base speed signal 610 for motor 41 is shown as being constant. However, in actual operation, the base speed signal 610 and thus the speed demand signal 536A for motor 41 can vary based on the pump demand signal 536 and/or the differential torque adjustment signal 564. As seen in FIG. 6A, the base speed signal 620 for motor 61 (see dotted line) is also at a value that is appropriate for the desired flow and/or pressure corresponding to the pump demand signal 536 and the differential torque adjustment signal 564. Preferably, the differential speed demand 640 between the base speed signal 610 for motor 41 and the base speed signal 620 for motor 61 corresponds to the differential torque adjustment signal 564. As each meshing pair MP1 to MPn enters the meshing region 78, a tooth-by-tooth adjustment (see Table 1 and y-axis of graph 600) is added to or subtracted from the base speed signal 620 for motor 61 to generate the speed demand signal 630 corresponding to speed demand signal 536B. Preferably, the tooth-by-tooth adjustments shown in Table 1 and graph 600 can correspond to a percentage change, an angular velocity change, or some other rotational or positional change. Although the adjustments shown in Table 1 and graph 600 are shown as integer adjustments, the adjustments can be in any format. In some embodiments, the LUTs can include the actual speed signal value to be used for speed demand signals (e.g., speed demand signal 536A, 536B) rather than adjustments to the base speed signals. Accordingly, in some preferred embodiments, the motion controller 530 (and/or another controller) can be configured to adjust for variations in the differential torque between each pair of meshing gear teeth 52, 72 on a tooth-by-tooth basis.

In some embodiments, to minimize the tooth-by-tooth adjustments, the differential torque setpoint signal 562 can be set such that an average differential torque value is in the middle of an acceptable differential torque range (e.g., a setpoint corresponding to a torque of 3 Nm for an acceptable torque range of 1 Nm to 5 Nm). The tooth-by-tooth adjustments are preferably made when the differential torque values fall outside the acceptable torque range and/or to the extent to keep the differential torque values within the acceptable torque range. In the above embodiment, the base speed signal for motor 41 is not modified based on the tooth-by tooth adjustments. However, in other embodiments, the base speed signal for motor 41 can be modified instead of the base speed signal for motor 61 or in addition to base speed signal for motor 61. By performing tooth-by-tooth adjustments to the base speed signals, variations in the contact force due to, for example, non-uniformity of teeth dimensions (or variations caused by some other reason) can be minimized such that the contract forces stay within a desired range. Of course, the above control schemes to provide the desired differential speed demand and/or the tooth-by-tooth adjustments are exemplary and other control schemes can be used.

In some embodiments, rather than the motion controller 530, the synchronized torque controller 560 can provide the tooth-by-tooth adjustments. For example, the differential torque adjustment signal 564 output by the synchronized torque controller 560 can include information for the tooth-by-tooth adjustments. The tooth-by-tooth adjustment information can then be output by the control mode switch in the differential demand adjustment signal 542. Preferably, the synchronized torque controller 560 and/or the motion controller 530 (and/or another controller) receives and correlates the tooth-by-tooth adjustment information in the differential demand adjustment signal 542 to the one or both of the position feedback signals 232A and 232B to determine a tooth-by-tooth adjustment of the differential speed demand.

The synchronized torque controller 560 and/or the motion controller 530 (and/or another controller) can include one or more LUTs to provide the above-described tooth-by-tooth adjustments. For example, more than one LUT can be used and a different LUT can be accessed by the appropriate controller based on the size of the pump, the direction of operation, the operating speed of the pump, the pump application (e.g., continuous operation, hydraulic equipment operation, type of fluid being pumped—e.g., abrasive, hydraulic, water, etc., or some other application), and/or some other criteria. Preferably, the LUT(s) for the tooth-by-tooth adjustment can be recalibrated (e.g., automatically) based on operating conditions. For example, the LUT(s) can be recalibrated based on the number of operating hours, number of starts, differential torque (e.g., corresponding to a contact force) exceeding a threshold, or for some other reason. In some cases, when the differential torque exceeds a desire range (e.g., corresponding to torque values less than 1 Nm and/or greater than 6 Nm), an alarm can be initiated. The alarm can be initiated prior to any recalibration of the LUTs and/or when the adjustment exceeds a threshold (e.g., a threshold where further adjustments are not possible and/or would destabilize the pump control). In some embodiments, a first threshold value corresponding to the differential torque can initiate a recalibration and a second threshold value that is greater than the first threshold value can initiate an alarm.

In some of the above exemplary embodiments, the pump 10 is controlled such that there is contact between the pairs of meshing gear teeth. However, there may be situations in which a gap between the corresponding pairs of meshing gear teeth is desired. For example, during startup of a pump, the fluid being pumped (e.g., hydraulic fluid in a hydraulic system) may not be at operating temperature. In such cases, running the pump inefficiently (e.g., with excess backflow or leakage) can heat up the fluid more quickly than if the pump was operated more efficiently. Similarly, even during normal operation of the pump, there may be situations in which it is desirable to run the pump inefficiently, for example, in cases where the temperature of the fluid drops for some reason. A gap may also be desirable when pumping abrasive fluid in order to minimize wear on the teeth.

In some embodiments, the pump control circuit 210 can include a synchronized position controller 550 that provides a gap adjustment signal 554, which can be used to precisely position the motors and/or gears of the pump 10. When the control mode signal 544 is set to position mode, the control mode switch 540 selects the gap adjustment signal 554 from the synchronized position controller 550 and then outputs a differential demand adjustment signal 542 that is based on the gap adjustment signal 554. The motion controller 530 uses the pump speed demand signal 536 and the differential demand adjustment signal 542 to precisely control the position of the motors 41, 61 (e.g., via motor controllers 570 and 580) to control a gap width between corresponding pairs of meshing gear teeth while maintaining a desired flow and/or pressure. Preferably, in synchronized position mode operation, the motion controller 530 momentarily adjusts the speed demand signal 536A and/or 536B based on the differential demand adjustment signal 542. However, unlike synchronized torque mode operation which is designed to create and/or maintain contact with a predetermined differential torque between the corresponding pairs of meshing gear teeth, synchronized position mode operation is designed to create and/or maintain a predetermined gap width between the corresponding pairs of meshing gear teeth. Preferably, the gap width can range from greater than zero (e.g., the gap width is near zero but not making contact) to ½ the clearance between the corresponding gear teeth. In some embodiments, the gap width can be zero (e.g., just making contact with little or no contact force).

In some embodiments, the pump control circuit 210 can include a gap feedback circuit 555 to calculate a gap width between corresponding pairs of meshing gear teeth. Preferably, the gap feedback circuit 555 receives precision feedbacks of the angular position of the motors 41,61 and/or gears 50,70, from, for example, position sensors 231A and 231B. For example, in some exemplary embodiments, the position sensors 231A and 231B can provide the angular position feedback signal 232A corresponding to the motor 41/gear 50 and angular position feedback signal 232B corresponding to the motor 61/gear 70, respectively, to the gap feedback circuit 555. In some embodiments, the gap feedback circuit 555 (and/or the another circuit such as, e.g., motor controllers 570 and 580) can determine the position of at least one gear tooth 52 in gear 50 relative to at least one gear tooth 72 in gear 70 based on the position feedback signals 232A, 232B. Preferably, the relative position can be determined to within, e.g., +/−0.0010° or to within +/−0.0065°. In some embodiments, the position sensors 231A, 231B can also measure and/or calculate the angular velocity of the shaft of the motor/gear.

Preferably, the position sensors 231A and 231B are calibrated to one or more reference points in order to measure the angular position of each gear. For example, the position of one or more gear teeth 52 on gear 50 can be correlated to a 360-degree rotational position on shaft 42 of motor 41 and/or the position of one or more gear teeth 72 can be correlated to a 360-degree rotational position on shaft 62 of motor 61. The reference point or points can be set as desired. Exemplary reference points designating 0 degrees, 90 degrees, 180 degrees, and 270 degrees are identified for gear 50 in FIG. 4. Similarly, exemplary reference points designating 0 degrees, 90 degrees, 180 degrees, and 270 degrees are also identified for gear 70. As seen in FIG. 4, the reference designations for gear 70 can be a mirror image of the reference designations for gear 50. In the exemplary embodiment of FIG. 4, the 0-degree reference designations for the teeth 52, 72 on each gear 50, 70 can correspond to an axis that is perpendicular to the flow axis of the pump with the 0-degree reference designations facing the meshing region 78 of the pump 10. The 180-degree designations for the gears 50, 70 can be on the side away from the meshing region 78. The 90-degree and 270-degree designations for each gear can be parallel to the flow axis, with the 90-degree designations for the respective gears 50, 70 located on the port 24 side and the 270-degree designations for the respective gears 50, 70 located on the port 22 side. Of course, the configuration of the reference points and degree designations is not limiting, and any desired configuration can be used. For example, the reference point or points can be any fixed point or points disposed on any combination of the motor (e.g., shaft), pump (e.g., casing), or other fixed reference. Preferably, the pump 10 includes one or both position sensors 231A, 231B to precisely track the rotational position of the respective motor rotor 46, 66 and thus the attached gear 50, 70. Preferably the position feedback signals 232A and 232B can correlate the position of one or more gear teeth 52, 72 relative to a 360-degree position on shaft 42, 62.

In some embodiments, the position sensors 231A, 231B can be encoders such as, for example, optical encoders, magnetic encoders or another type of encoder that can measure the position of the rotors 46, 66 of motors 41, 61 and/or the gears 50, 70. In some embodiments, the position sensors 231A, 231B can measure an angular position of one or more teeth 52, 72 (or other reference points) on gears 50, 70, respectively, to within a range of, e.g., +/−0.0010° to +/−0.0065°. In the case of FIG. 4, where the shafts are stationary, the sensors 231A, 231B can be disposed so as to measure an angular position of the rotors 46, 66 and/or gears 50, 70 relative to the respective shafts 42, 62 of the motors 41, 61. In some embodiments, addition position sensors can be used to monitor the rotors 46, 66 and the gears 50, 70. In some embodiments, the position sensors 231A, 231B can measure an angular position of the rotors 46, 66 and/or gears 50, 70 relative to a fixed point on the pump casing. In some embodiments, the position sensors 231A, 231B can also measure and/or calculate the angular velocity of the rotors/gears relative to the respective shafts (or a fixed point on the pump casing). Preferably, the gap feedback circuit 555 (and/or the another circuit such as, e.g., motor controllers 570 and 580) includes the hardware and/or algorithms, set of instructions, and/or program code that can be executed by a processor to correlate the position of at least one protrusion and/or indent (e.g., gear tooth 52, 72) of each gear 50, 70 of the respective fluid drivers 40, 60 relative to a reference point and/or relative to each other based on the position feedback signals 232A, 232B.

Preferably, the synchronized position controller 550 outputs a gap adjustment signal 554 that is based on the difference between the gap feedback signal 234 and the gap setpoint 552. In some embodiments, the synchronized position controller can include a LUT or other data structure, a proportional circuit, a PI circuit, a PID circuit and/or some other controller or circuit that outputs a signal that corrects for the difference between the gap feedback signal 234 and the gap setpoint 552. When in synchronize position mode operation, the motion controller 530 preferably controls a position of one gear relative to the other gear based on the differential demand adjustment signal 542, which corresponds to the gap adjustment signal 554. For example, the motion controller 530 can be configured to dynamically synchronize the relative position between one or more pairs of meshing gear teeth 52, 72 to create and/or maintain a predetermined gap width during operation of the gear pump 10. Preferably, based on the differential demand adjustment signal 542, the motion controller 530 adjusts the differential speed demand of the speed demand signals 536A and 536B to control the gap width. Preferably, the relative position between the corresponding gear teeth can be established based on a distance between a reference point on one tooth relative to a reference point on the other corresponding tooth.

Figure 7:
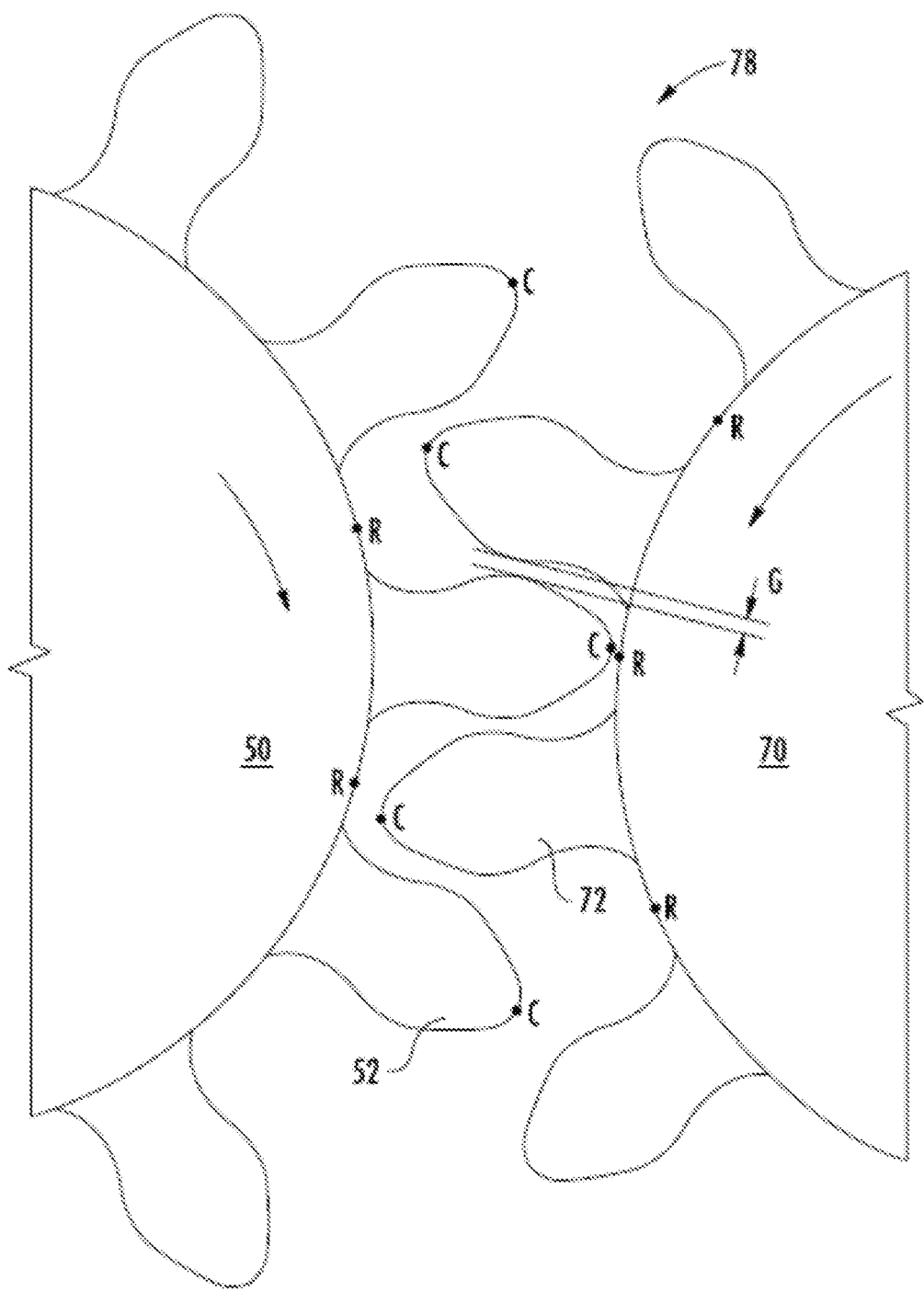
FIG. 7 is an enlarged view of the meshing area of an external gear pump using a gap control scheme.

In exemplary embodiments, the gap feedback circuit 555 (and/or another circuit) can be configured to generate the gap feedback signal 234 corresponding to the gap width G (see FIG. 7) for one or more pairs of meshing gear teeth 52, 72. For example, as seen in FIG. 7, in some embodiments, the gap feedback circuit 555 can be configured to track at least a center of a crown, herein after point C, (or some other reference point) for one or more teeth on each of the gears 50, 70 and a center of a root, herein after point R, (or some other reference point) for one or more roots on each of the gears 50, 70. Preferably, the gap feedback circuit 555 can track at least one pair of meshing gear teeth 52, 72 has a reference point C one tooth of the pair and a reference point R on the other tooth of the pair. Of course, the reference points are not limited to the centers of the crown and root of teeth and other locations on the gears can be used as reference points. For brevity and clarity, however, exemplary embodiments in which the reference points are points C and R are shown.

For one or more pairs of meshing gear teeth 52, 72, based on the position feedback signals 232A, 232B, the gap feedback circuit 555 can track the reference points C and R on the respective gears and can calculate the distance between opposing gear tooth faces to determine the gap width G. For example, as the gears 50, 70 rotate, the drive position controller 550 can determine the angular positions of one or more reference point pairs C and R corresponding to respective pair of meshing gear teeth relative to a 360-degree angular position on the shafts 42, 62 (e.g., as discussed above) and/or a relative distance between the points C and R. Preferably the gear dimensions (gear size, gear tooth dimensions, etc.) are known to the gap feedback circuit 555. For example, the gear dimensions can be stored in a data structure (e.g., a LUT) or in some other data structure that is accessible to the gap feedback circuit 555. Based on the angular positions and/or the relative distance therebetween when the pair of points C and R are closest to each other, the synchronized position controller 550 (and/or the motion controller 530 and/or another circuit) can use the gear dimension information to calculate the distance between opposing gear faces of the pair of teeth to determine the gap width G between the tooth faces.

Preferably, the sensors 231A, 231B can precisely track the positions of one or more the reference point pairs C and R corresponding to one or more pair of meshing gear teeth 52, 72. For example, in some embodiments, the sensors 231A, 231B can include high resolution encoders that have a count resolution in a range of 100,000 to four million per revolution, which can depend on the gear design and rpm of the motor. Preferably, the drive position controller 550 is configured to receive feedback of the position and/or the angular velocity of the motors 41, 61 and thus the gears 50, 70 via the sensors 231A, 231B. Preferably, the resolution of the sensors 231A, 231B (e.g., encoders) is high enough that position data is not lost. That is, if the sensor resolution is low compared to the operating speed of the pump, then it is possible for the position feedback circuit to miss information, such as, for example, one or more pulses, from the tooth being tracked. Preferably, in embodiments where the sensors 231A, 231B are encoders, the encoder count is equal to or greater than 1.5 times the feedback count value corresponding to the fastest pump speed.

Preferably, when the control mode signal 544 is set to synchronize position mode operation, the differential demand adjustment signal 542 corresponds to the gap adjustment signal 554. In some embodiments, the synchronized position controller 550 is configured such that, when the gap feedback signal 234 deviates from the gap setpoint signal 552 (e.g., by a predetermined amount), the gap adjustment signal 554 changes based on the deviation. For example, the synchronized position controller can provide a change in the gap adjustment signal 554 that is used by the motion controller 530 (e.g., via differential demand adjustment signal 542) to adjust one or both of the speed demand signals 536A and 536B until the gap feedback signal 234 matches the gap setpoint 552 and/or is within a predetermined amount of the gap setpoint 552. The gap feedback signal 234 can be based on a gap width between one or more representative pairs of meshing gear teeth, based on an average gap width between all meshing pairs, and/or based on a gap width calculated on a tooth-by-tooth basis.

During synchronized position mode operation, the motion controller 530 sets the speed demand signals 536A and 536B based on the pump speed demand signal 536 such that the differential speed demand is zero (e.g., both speed demand signals 536A and 536B have the same value). That is, the motors 41, 61 (and thus the gears 50, 70) rotate at the same tooth speed. When the gap width G between a corresponding pair or pairs of meshing gear teeth deviates from the gap setpoint signal 552 (e.g., by a predetermined amount), the synchronized position controller 550 can provide an appropriate adjustment in the gap adjustment signal 554 that is received by the motion controller 530 via the differential demand adjustment signal 542. The motion controller 530 then increases either speed demand signal 536A or 536B and/or decreases the other speed demand signal 536A, 536B as appropriate such that the differential speed demand is non-zero for a predetermined momentary time period. Preferably, the predetermined momentary time period is based on the gear dimensions. Depending on the gear dimensions, a predetermined momentary non-zero time period can be, e.g., in a range of 1 to 3 counts on a speed sensor having a high-resolution encoder. In some embodiments, the predetermined momentary time period can be in a range of 0.001 to 0.005 seconds. Once the desired gap width G is achieved, the differential speed demand can be set to zero again by the motion controller 530.

As discussed above, the gap feedback signal 234 can be based on an average of the gap width G (e.g., of the representative pairs or all pairs) as the gears 50, 70 rotate. When controlling to the average of the gap width G, the instantaneous gap width G between each pair of meshing gear teeth 52, 72 can be greater or smaller than the average due to, for example, non-uniformity in gear dimensions (or for some other reason). Accordingly, in some embodiments, similar to the synchronized torque mode the motion controller 530 can control the gap width G on a tooth-by-tooth basis to take into account the variations in the gear dimensions. For example, along with adjusting the speed demand signal 536A and/or 536B based on the gap adjustment signal 554 (via the differential demand adjustment signal 542), the motion controller 530 can include a LUT and/or other data structure that provides a further adjustment to the speed demand signal 536A and/or 536B to adjust the gap width G on a tooth-by-tooth basis (e.g., to take into account variations in tooth dimensions). Those skilled in the art will understand that the tooth-by-tooth adjustment and the LUT (and/or other data structure) for the gap width G is similar to the tooth-by-tooth adjustment and the LUT (and/or other data structure) for the differential torque. Thus, for brevity, a detailed description of the tooth-by-tooth adjustments is omitted. In some embodiments, the synchronized position controller 550 can provide the tooth-by-tooth adjustment via the gap adjustment signal 554.

In related art systems, a gap between the gears is generally undesirable as it causes more backflow or fluid slip, which means the slip factor or slip flow coefficient (a measure of the fluid slip) is relatively high, and thus the pump is less efficient. In exemplary embodiments of the present disclosure, however, the pump can be operated in synchronized position mode operation in which the gap width G (and thus the slip flow coefficient or slip coefficient) can be varied based on parameters such as fluid density, viscosity, temperate, pressure, volumetric flow, and/or other properties of the fluid. For example, in a closed loop system the working fluid, e.g., hydraulic oil or hydraulic fluid, water, or some other working fluid, can be less than the optimal working temperature and/or viscosity. By running the pump at a high slip coefficient, e.g., a slip coefficient that is 6% or greater, the working fluid can heat up, which can lower the viscosity. While inefficiently operating the pump at a high slip coefficient is generally undesirable, in some cases operation at a high slip coefficient can be more desirable in order to bring the fluid system up to operational temperature as fast as possible, e.g., in situations where the viscosity of the working fluid is relatively high (e.g., at the start of the pumping operation or if the pump is operating in a cold environment). In such cases, operating the pump with a gap between pairs of meshing gear teeth will raise the temperature of the working fluid due to the inefficient operation of the pump.

Preferably, the gap width G can be varied from slightly greater than zero to a maximum of ½ the clearance between the teeth (crown of one tooth in center of the root of the other). In exemplary embodiments, the gap width G can be zero with the gears just contacting each other with little or no contact force. Preferably, the motion controller 530 (or another controller) can vary the gap width G between pairs of meshing gear teeth 52, 72 based on, e.g., temperature of the working fluid, pump and/or system startup sequence, mode of operation (startup, normal, shutdown), and/or some other criteria. For example, the gap width G can be at its maximum (crown of a tooth of one gear centered exactly in the middle a root of the opposing gear) at startup and slowly close until contact is made and the end of the startup sequence. In another scenario, the gap width G can start to open when the temperature of the working fluid drops below a predetermined temperature and close again as the fluid temperature starts to rise. Preferably, the motion controller 530 (and/or another controller) is configured to receive feedback of the temperature (not shown) of the working fluid. During normal operation, if the temperature of the working fluid drops below a predetermined value, the motion controller 530 (or another controller) can open the gap width G based on the temperature to increase the slip coefficient and heat up the working fluid. Accordingly, exemplary embodiments of the present disclosure allow for a variable slip coefficient during operation of the pump.

It should be noted that the gap width G is in reference to the restriction in the backflow path. Obviously, if one side face of a gear tooth is in contact with the opposing gear the other side face of the gear tooth will have a gap that corresponds to the full clearance between the teeth. However, the gap that the backflow path sees is zero (or near zero), i.e., the backflow path is blocked (or nearly blocked) since one set of tooth faces are in contact. Preferably, when the sensors 231A, 231B are encoders, the motion controller 530 can control the gap width G incrementally based on the encoder count. Preferably, each increment change ("offset") represents an integer number of encoder counts corresponding to the clearance between the meshing teeth. For example, if each encoder count represents an offset and there are 20 encoder counts corresponding to the clearance between the teeth of the pair of meshing gear teeth, the controller can control between an offset of 0, which can correspond to the point where the gears make contact, to an offset of 10, which represents the point where center of the crown (e.g., point C) of one gear aligns with the center of the root (e.g., point R) of the other gear—maximum gap width G. Of course, an offset of 0 can represent the maximum gap G and 10 represent the point at which the gears make contact. If each offset represents two encoder counts, the maximum offset will be 5 in the above scenario.

In some embodiments, the gap width G can be controlled such that the gap width G is zero but with little or no contact force (also referred to herein as "minimum gap mode"). In minimum gap mode, the position of one gear is controlled such that its teeth just make contact with the teeth of the opposing gear. However, there is little or no force applied to maintaining the contact. Thus, because there is no contact force, the position of the teeth 52, 72 is tracked to ensure there is contact rather than using other feedbacks such as, for example, motor currents. Of course, other feedbacks such as, for example, motor currents can still be used to ensure that one gear is not applying too much force on the other gear.

In minimum gap mode, the synchronized position controller 550 preferably uses a gap width setpoint signal 552 that is at zero. The contact between the teeth is established by the tracking the position of the teeth (e.g., points C and R) and determining when the gears have made contact based on the tracked positions and the known dimensions of the gear. Alternatively, or in addition to tracking the positions, other feedbacks, as discussed above with respect to contact mode operation, can be used. In some exemplary embodiments, the predetermined value can be less than 1 Nm or some other value based on the system operation and/or architecture. Preferably, if the differential torque reaches or exceeds the predetermined value, e.g., 1 Nm or greater or some other desired value, one or both motors are controlled such that the differential torque reduces to zero or nearly zero, e.g., by driving the slower driven gear a little faster and/or by driving the faster driven gear a little slower. Preferably, if the differential torque exceeds the predetermined threshold, e.g., 6 Nm or some other desired value, an alarm is initiated indicating that there may be a problem in the controls.

Because there is contact between opposing gear teeth in the minimum gap mode, backflow or slip flow is minimized and the slip coefficient is lower than if there is a gap width G greater than zero. The minimum gap mode represents an efficient mode of operation of the pump because backflow or slip flow is minimized and little or no extra energy from one or both of the motors is used to maintain a contact force. Minimum gap mode of operation can be desirable in applications where minimal gear wear is desired and some inefficiency in the pump, as explained below, is acceptable. For example, if the pump 10 is pumping abrasive fluids then it may be desirable to minimize the contact force on the teeth by operating the system in minimum gap mode.

Minimum gap mode, however, can lead to inefficient pump operation at times because a gap can occasionally form between the pairs of meshing gear teeth at high gear speeds. Although modern digital control systems have fast update times (clock speeds), depending on the pump speed and encoder resolution (e.g., the encoder pulses per revolution (PPR) count), the accuracy of the gear position and/or gear angular velocity feedback values decreases. Accordingly, if the encoder resolution is not high enough, the gap feedback circuit 555, the synchronized position controller 550, and/or the motion controller 530 (and/or another controller) may not be able to accurately track and control the positions of the gear teeth at higher angular velocities of the gears and the gear-to-gear contact may not be maintained at least until the next updated feedback signal. Thus, at high pump speeds relative to the encoder resolution, the motion controller 530 may not be able to maintain the contact between the gears due to limitations in the digital controls (e.g., the encoder can skip pulses), and this condition could exist until the position of the gear teeth are correctly tracked again. As indicated above, if contact is not maintained, the slip factor increases and the pump runs inefficiently. Moreover, the temperature of the fluid will increase, which decreases the viscosity and further degrades the efficiency of the pump. Accordingly, while minimum gap mode operation provides a balance between teeth wear and pump efficiency when operating the pump within the encoder resolution, when operating at high pump speeds at the edge of the encoder resolution, it can be preferable to operate the pump 10 in synchronized torque mode operation, as discussed above, with a torque setpoint 562 that is 1 Nm or more or some other desired value based on system operation and/or architecture.

All or a portion of the actuator control system 200, including control unit 266 and/or the drive unit 295, pump control circuit 210, valve control circuit 220 and/or any other component of controller can be implemented in, e.g., hardware and/or algorithms and/or programming code executable by a processor. The actuator control system 200, including the pump control circuit 210, is not limited to application such as the hydraulic system shown in FIG. 1. Other applications can include fields aeronautics, automotive, industrial systems, medical systems, agriculture, or any other application that require a pump. The control unit 266 of actuator control system 200 can be configured as appropriate depending on the type of application and, depending on whether the application requires user input, that control unit 266 can be configured to receive inputs from an operator's input unit 276. Input unit 276 can be, e.g., a control panel that can include user interfaces to allow the operator to communicate with the control unit 266. For example, the control panel can include digital and/or analog displays such as, e.g., LEDs, liquid crystal displays, CRTs, touchscreens, meters, and/or another type of display which communicate information to the operator via a textual and/or graphical user interface (GUI), indicators (e.g., on/off LEDs, bulbs) and any combination thereof; and digital and/or analog input devices such as, e.g., touchscreens, pushbuttons, dials, knobs, levers, joysticks and/or other similar input devices; a computer terminal or console with a keyboard, keypad, mouse, trackball, touchscreen or other similar input devices; a portable computing device such as a laptop, personal digital assistant (PDA), cell phone, digital tablet or some other portable device; or a combination thereof.

The actuator control system 200 can be provided to exclusively control the fluid-driven actuator system 1 or other application. Alternatively, the control unit 266 can be part of and/or in cooperation with another control system for a system, machine or another application in which the pump 10 operates. The actuator control system 200 (e.g., control unit 266) can include a central processing unit (CPU) which performs various processes such as commanded operations or pre-programmed routines, algorithms, instructions, and/or other program code. The process data and/or routines can be stored in a memory. The routines can also be stored on a storage medium disk such as a hard drive (HDD) or portable storage medium or can be stored remotely. However, the storage media is not limited by the media listed above. For example, the routines can be stored on CDs, DVDs, in FLASH memory, RAM, ROM, PROM, EPROM, EEPROM, hard disk or any other information processing device with which the computer aided design station communicates, such as a server or computer.

The CPU can be a Xenon or Core processor from Intel of America or an Opteron processor from AMD of America, or can be other processor types that would be recognized by one of ordinary skill in the art. Alternatively, the CPU can be implemented on an FPGA, ASIC, PLD or using discrete logic circuits, as one of ordinary skill in the art would recognize. Further, the CPU can be implemented as multiple processors cooperatively working in parallel to perform commanded operations or pre-programmed routines.

The actuator control system 200, e.g., control unit 266, can include a network controller, such as an Intel Ethernet PRO network interface card from Intel Corporation of America, for interfacing with a network. As can be appreciated, the network can be a public network, such as the Internet, or a private network such as a LAN or WAN network, or any combination thereof and can also include PSTN or ISDN sub-networks. The network can also be wired, such as an Ethernet network, or can be wireless, such as a cellular network including EDGE, 3G, and 4G wireless cellular systems. The wireless network can also be WiFi, Bluetooth, or any other wireless form of communication that is known. The actuator control system 200, e.g., control unit 266 can receive a command from an operator via a user input device such as a keyboard and/or mouse via either a wired or wireless communication. In addition, the communications between control unit 266, drive unit 295, the motor controllers 570, 580, and valve controllers can be analog or via digital bus and can use known protocols such as, e.g., controller area network (CAN), Ethernet, common industrial protocol (CIP), Modbus and other well-known protocols.

Embodiments of the controllers and/or modules in the present disclosure can be provided as a hardwire circuit and/or as a computer program product. As a computer program product, the product may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), field programmable gate arrays (FPGAs), application-specific integrated circuits (ASICs), vehicle identity modules (VIMs), magnetic or optical cards, flash memory, or other type of media/machine-readable medium suitable for storing electronic instructions.

The term "module" refers broadly to a software, hardware, or firmware (or any combination thereof) component. Modules are typically functional components that can generate useful data or other output using specified input(s). A module may or may not be self-contained. The controllers discussed above may include one or more modules.

Although the above drive-drive embodiments were described with respect to an external gear pump arrangement with spur gears having gear teeth, it should be understood that those skilled in the art will readily recognize that the concepts, functions, and features described below can be readily adapted to external gear pumps with other gear configurations (helical gears, herringbone gears, or other gear teeth configurations that can be adapted to drive fluid), internal gear pumps with various gear configurations, to pumps having more than two prime movers, to prime movers other than electric motors, e.g., hydraulic motors or other fluid-driven motors, inter-combustion, gas or other type of engines or other similar devices that can drive a fluid displacement member, and to fluid displacement members other than an external gear with gear teeth, e.g., internal gear with gear teeth, a hub (e.g. a disk, cylinder, other similar component) with projections (e.g. bumps, extensions, bulges, protrusions, other similar structures or combinations thereof), a hub (e.g. a disk, cylinder, or other similar component) with indents (e.g., cavities, depressions, voids or other similar structures), a gear body with lobes, or other similar structures that can displace fluid when driven. Accordingly, for brevity, detailed description of the various pump configurations is omitted. In addition, those skilled in the art will recognize that, depending on the type of pump, the contact (drive-drive) can aid in the pumping of the fluid instead of or in addition to sealing a reverse flow path. For example, in certain internal-gear gerotor configurations, the contact or meshing between the two fluid displacement members also aids in pumping the fluid, which is trapped between teeth of opposing gears. Further, while the above embodiments have fluid displacement members with an external gear configuration, those skilled in the art will recognize that, depending on the type of fluid displacement member, the contact or meshing is not limited to a side-face to side-face contact and can be between any surface of at least one projection (e.g. bump, extension, bulge, protrusion, other similar structure, or combinations thereof) on one fluid displacement member and any surface of at least one projection (e.g. bump, extension, bulge, protrusion, other similar structure, or combinations thereof) or indent (e.g., cavity, depression, void or other similar structure) on another fluid displacement member.

The fluid displacement members, e.g., gears in the above embodiments, can be made entirely of any one of a metallic material or a non-metallic material. Metallic material can include, but is not limited to, steel, stainless steel, anodized aluminum, aluminum, titanium, magnesium, brass, and their respective alloys. Non-metallic material can include, but is not limited to, ceramic, plastic, composite, carbon fiber, and nano-composite material. Metallic material can be used for a pump that requires robustness to endure high pressure, for example. However, for a pump to be used in a low pressure application, non-metallic material can be used. In some embodiments, the fluid displacement members can be made of a resilient material, e.g., rubber, elastomeric material, to, for example, further enhance the sealing area.

Alternatively, the fluid displacement member, e.g., gears in the above embodiments, can be made of a combination of different materials. For example, the body can be made of aluminum and the portion that makes contact with another fluid displacement member, e.g., gear teeth in the above exemplary embodiments, can be made of steel for a pump that requires robustness to endure high pressure, a plastic for a pump for a low pressure application, a elastomeric material, or another appropriate material based on the type of application.

Exemplary embodiments of the fluid delivery system can displace a variety of fluids. For example, the pumps can be configured to pump hydraulic fluid, engine oil, crude oil, blood, liquid medicine (syrup), paints, inks, resins, adhesives, molten thermoplastics, bitumen, pitch, molasses, molten chocolate, water, acetone, benzene, methanol, or another fluid. As seen by the type of fluid that can be pumped, exemplary embodiments of the pump can be used in a variety of applications such as heavy and industrial machines, aeronautics applications, automobile applications, chemical industry, food industry, medical industry, commercial applications, residential applications, or another industry that uses pumps. Factors such as fluid density, viscosity temperature of the fluid, desired pressures and flow for the application, the configuration of the fluid displacement member, the size and power of the motors, physical space considerations, weight of the pump, or other factors that affect pump configuration will play a role in the pump arrangement. It is contemplated that, depending on the type of application, the exemplary embodiments of the fluid delivery system discussed above can have operating ranges that fall with a general range of, e.g., 1 to 5000 rpm. However, in aerodynamic applications, the pump can have operating ranges that are 6000 to 12,000 rpm or greater. Of course, these ranges are not limiting and other ranges are possible.

In addition, the dimensions of the fluid displacement members can vary depending on the application of the pump. For example, when gears are used as the fluid displacement members, the circular pitch of the gears can range from less than 1 mm (e.g., a nano-composite material of nylon) to a few meters wide in industrial applications. The thickness of the gears will depend on the desired pressures and flows for the application.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An apparatus, comprising:
a torque adjustment circuit configured to receive a torque setpoint and a torque feedback signal corresponding to a differential torque between a pair of meshing gear teeth of a first gear and a second gear, the torque adjustment circuit further configured to output a torque adjustment signal corresponding to a difference between the torque setpoint and the torque feedback signal; and
a motion control circuit configured to:
provide a first speed demand signal to a first motor that drives the first gear and a second demand signal to a second motor that drives the second gear, and
dynamically synchronize torque between the pair of meshing gear teeth such that the differential torque between the pair of meshing gear teeth is within a predetermined range by adjusting at least one of the first speed demand signal or the second speed demand signal based on the torque adjustment signal,
wherein the torque feedback signal is an average differential torque based on at least one revolution of the first gear or the second gear, and
wherein the torque setpoint is based on an average torque value for the pair of meshing gear teeth.

2. The apparatus of claim 1, wherein the torque feedback signal is based on at least one of a first motor current of the first motor or a second motor current of the second motor.

3. The apparatus of claim 1, wherein the motion control circuit is configured to receive a speed demand signal corresponding to a predetermined speed for the first and second gears, and
wherein the adjusting of the at least one of the first speed demand signal or the second speed demand signal is further based on the speed demand signal.

4. The apparatus of claim 1, wherein the adjustment of the at least one of the first speed demand signal or the second speed demand signal is performed on a tooth-by-tooth basis.

5. The apparatus of claim 4, wherein the tooth-by-tooth basis adjustment corresponds to predetermined adjustments stored in a data-structure.

6. The apparatus of claim 1, wherein the predetermined range is between 1 Nm and 10 Nm, inclusive of 1 Nm and 10 Nm.

7. A pump system comprising:
a pump assembly that includes,
a pump casing defining an interior volume,
a first gear and a second gear disposed in the interior volume such that the first gear meshes with the second gear,
a first motor to drive the first gear, and
a second motor to drive the second gear; and
a controller circuit that includes,
a torque adjustment circuit configured to receive a torque setpoint and a torque feedback signal corresponding to a differential torque between a pair of meshing gear teeth of the first gear and the second gear, the torque adjustment circuit further configured to output a torque adjustment signal corresponding to a difference between the torque setpoint and the torque feedback signal; and
a motion control circuit configured to:
provide a first speed demand signal to the first motor that drives the first gear and a second demand signal to the second motor that drives the second gear, and
dynamically synchronize torque between the pair of meshing gear teeth such that the differential torque between the pair of meshing gear teeth is within a predetermined range by adjusting at least one of the first speed demand signal or the second speed demand signal based on the torque adjustment signal,
wherein the torque feedback signal is an average differential torque based on at least one revolution of the first gear or the second gear, and
wherein the torque setpoint is based on an average torque value for the pair of meshing gear teeth.

8. The system of claim 7, wherein the torque feedback signal is based on at least one of a first motor current of the first motor or a second motor current of the second motor.

9. The system of claim 7, wherein the motion control circuit is configured to receive a pump speed demand signal corresponding to at least one of a predetermined flow setpoint or a predetermined pressure setpoint, and
wherein the adjusting of the at least one of the first speed demand signal or the second speed demand signal is further based on the pump speed demand signal.

10. The system of claim 7, wherein the adjustment of the at least one of the first speed demand signal or the second speed demand signal is performed on a tooth-by-tooth basis.

11. The system of claim 10, wherein the tooth-by-tooth basis adjustments correspond to predetermined adjustments stored in a data-structure.

12. The system of claim 7, wherein the predetermined range is between 1 Nm and 10 Nm, inclusive of 1 Nm and 10 Nm.

13. A method of controlling motors of a pump in a drive-drive configuration, the method comprising:
providing a first speed demand signal to a first motor that drives a first gear;
providing a second demand signal to a second motor that drives a second gear;
receiving a torque setpoint;
receiving a torque feedback signal corresponding to a differential torque between a pair of meshing gear teeth of the first gear and the second gear;
outputting a torque adjustment signal corresponding to a difference between the torque setpoint and the torque feedback signal; and
dynamically synchronizing torque between the pair of meshing gear teeth such that the differential torque between the pair of meshing gear teeth is within a predetermined range by adjusting at least one of the first speed demand signal or the second speed demand signal based on the torque adjustment signal,
wherein the torque feedback signal is an average differential torque based on at least one revolution of the first gear or the second gear, and
wherein the torque setpoint is based on an average torque value for the pair of meshing gear teeth.

14. The method of claim 13, wherein the torque feedback signal is based on at least one of a first motor current of the first motor or a second motor current of the second motor.

15. The method of claim 13, further comprising:
receiving a speed demand signal corresponding to a predetermined speed for the first and second gears, wherein the adjusting of the at least one of the first speed demand signal or the second speed demand signal is further based on the speed demand signal.

16. The method of claim 13, wherein the adjustment of the at least one of the first speed demand signal or the second speed demand signal is performed on a tooth-by-tooth basis.

17. The method of claim 13, wherein the predetermined range is between 1 Nm and 10 Nm, inclusive of 1 Nm and 10 Nm.

\* \* \* \* \*